(12) United States Patent
Yadav et al.

(10) Patent No.: US 9,866,427 B2
(45) Date of Patent: Jan. 9, 2018

(54) MULTI-STAGE SWITCH FABRIC FAULT DETECTION AND HANDLING

(71) Applicant: Juniper Networks, Inc., Sunnyvale, CA (US)

(72) Inventors: Alam Yadav, Bangalore (IN); Mukul Golash, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 186 days.

(21) Appl. No.: 14/623,083

(22) Filed: Feb. 16, 2015

(65) Prior Publication Data
US 2016/0241430 A1    Aug. 18, 2016

(51) Int. Cl.
| | |
|---|---|
| H04L 12/24 | (2006.01) |
| H04Q 11/04 | (2006.01) |
| H04L 12/703 | (2013.01) |
| H04L 12/26 | (2006.01) |
| H04L 12/931 | (2013.01) |

(52) U.S. Cl.
CPC ...... *H04L 41/0654* (2013.01); *H04L 43/0811* (2013.01); *H04L 45/28* (2013.01); *H04L 49/00* (2013.01); *H04Q 11/04* (2013.01)

(58) Field of Classification Search
None
See application file for complete search history.

(56) References Cited

U.S. PATENT DOCUMENTS

| | | | |
|---|---|---|---|
| 6,404,740 B1* | 6/2002 | Yoshida | H04L 12/2697 370/241.1 |
| 7,102,999 B1 | 9/2006 | Sindhu et al. | |
| 8,325,726 B2 | 12/2012 | Baban et al. | |
| 8,902,780 B1 | 12/2014 | Hegde et al. | |
| 8,953,605 B1* | 2/2015 | Mehra | H04L 45/58 370/392 |
| 2003/0063839 A1* | 4/2003 | Kaminski | H04Q 11/0005 385/17 |
| 2003/0112749 A1* | 6/2003 | Hassink | H04L 12/66 370/225 |

(Continued)

FOREIGN PATENT DOCUMENTS

| | | |
|---|---|---|
| EP | 0511834 A2 | 11/1992 |
| EP | 2680510 A1 | 1/2014 |

OTHER PUBLICATIONS

Montano, "Network Fabric Implications for Data Center Design," Juniper Networks, Inc., Nov. 2, 2010, 84 pp.

(Continued)

*Primary Examiner* — Kodzovi Acolatse
(74) *Attorney, Agent, or Firm* — Shumaker & Sieffert, P.A.

(57) ABSTRACT

In some examples, a switching system includes a plurality of fabric endpoints and a multi-stage switching fabric having a plurality of fabric planes each having a plurality of stages to switch data units between any of the plurality of fabric endpoints. A fabric endpoint of the fabric endpoints is configured to send, to a switch of a first one of the stages and within a first fabric plane of the plurality of fabric planes, a self-ping message destined for the fabric endpoint. The fabric endpoint is configured to send, in response to determining the fabric endpoint has not received the self-ping message after a predetermined time, an indication of a connectivity fault for the first fabric plane.

30 Claims, 14 Drawing Sheets

(56) References Cited

U.S. PATENT DOCUMENTS

2006/0274673 A1* 12/2006 Fleury ................... H04L 12/413
370/254
2008/0044181 A1 2/2008 Sindhu
2011/0161489 A1* 6/2011 Bhatt .................... H04L 45/245
709/224
2012/0051738 A1* 3/2012 Skirmont ........... H04B 10/0773
398/25

OTHER PUBLICATIONS

Extended Search Report from counterpart European Application No. 16155729.3, dated Jul. 7, 2016, 7 pp.
Response to Communication pursuant to Rule 69 EPC dated Aug. 22, 2016, from counterpart European Application No. 16155729.3, filed Feb. 8, 2017, 12 pp.

* cited by examiner

MULTI-STAGE SWITCH FABRIC FAULT DETECTION AND HANDLING

TECHNICAL FIELD

The disclosure relates to computer networks and, more particularly, to communicating packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

A variety of routers exist within the Internet. Network Service Providers (NSPs), for example, maintain "edge routers" to provide Internet access and other services to the customers. Examples of services that the NSP may provide include Voice over IP (VoIP), access for Asynchronous Transfer Mode (ATM) or frame relay communications, Internet protocol (IP) data services, and multimedia services, such as video streaming. The edge routers of the NSPs often communicate network traffic to high-speed "core routers," which may be generally viewed as forming the backbone of the Internet. These core routers often include substantially more processing resources than the edge routers, and are designed to handle high volumes of network traffic.

In some examples, a core router or another router or switching device may employ a distributed, multi-stage switch fabric architecture, in which network packets traverse multiple stages of the switch fabric located in distributed forwarding components of the router to travel from an ingress point of the switch fabric to an egress point of the switch fabric. As one example, a switch fabric may be implemented as a single multi-stage Clos switch fabric, which relays communications across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches—often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may viewed as an independent portion of the multi-stage Clos switch fabric, where each plane provides switching redundancy.

Many core routers are "multi-chassis" routers in which multiple routing nodes are physically coupled and configured to operate as a single routing node. One example of a multi-chassis router includes multiple line card chassis (LCCs), each of which includes one or more interface cards (IFCs) for sending and receiving packets, the LCCs coupled to a central switch control chassis (SCC) that provides top-down management of the LCCs. To peer routers on the network, the multi-chassis router appears as a single routing node. Because multi-chassis routers combine resources of multiple routing devices, multi-chassis routers have much higher bandwidth capabilities than standalone routers. For example, the use of multi-chassis routers can simplify and improve routing on a service provider network by consolidating routing functions onto fewer routers.

SUMMARY

In general, techniques are described for scalable detection and notification of fault in devices or networks that employ a multi-stage switch fabric. The techniques may be particularly applicable within large-scale and complex switching devices or networks having multiple fabric planes connecting many hundreds of fabric endpoints all managed by a distributed control plane, although the techniques remain applicable in small-scale devices and networks as well. In some examples, a fabric endpoint may verify respective per-plane fabric connectivity with the switch fabric by issuing self-ping data units to the switch fabric, which switches the fabric messages through the intermediate stages back to the issuing fabric endpoint. Failure of the fabric endpoint to receive an issued self-ping data unit indicates a connectivity fault for the fabric endpoint with respect to a fabric plane. In response to detecting a connectivity fault, the fabric endpoint utilizes the switch fabric to broadcast, in the data path, an indication of the connectivity fault between the fabric endpoint and the switch fabric to the other fabric endpoints. Rather than unicasting the indication of the connectivity fault to each of the other fabric endpoints, the fabric endpoint that has detected the connectivity fault may instead rely on the first stage for one of the working fabric planes to relay the indication to the final stage switches and the other fabric endpoints connected thereto. Fabric endpoints receiving the indication responsively avoid using the failed fabric plane to send data to the fabric endpoint having the connectivity fault.

In some examples, fabric endpoints as well as fabric chips, which implement the crossbars switches for each stage of the multi-stage switch fabric, may detect fabric link and reachability faults of the fabric links coupling stage crossbars to one another and to the fabric endpoints. In response to detecting a link fault for a fabric plane, the fabric endpoints and fabric chips of the fabric plane may relay, in the data path, an indication of the link fault to a corresponding fabric chip that implements a corresponding first stage crossbar switch for the fabric link having the link fault. The fabric chip broadcasts this indication to all of the fabric chips that implement a crossbar switch for the final stage of the fabric plane with the link fault. The final stage fabric chip may in turn notify the fabric endpoints, which responsively avoid at least the portion of the fabric plane with the link fault.

The scalable detection and fault notification techniques described above may have one or more advantages. For example, performing distributed fault detection and signaling in the data path by the fabric endpoints rather than by a control path may result in faster fault detection. Moreover, distributing the data path processing workload for fault notification among the fabric chips that implement the fabric stages may scale fault notification dissemination to the fabric endpoints in such a manner as to reduce traffic black-holing until the fabric controller can re-route the switch fabric. Distributed fault notification by the fabric chips to the fabric endpoints may additionally enable fault notification using a number of fault notification messages within the switch fabric that is independent of the number of fabric planes and the number of fabric endpoints, which may support a larger scale, and reduce the workload on the fabric endpoints both in terms of the number of fault notifications generated and received.

In some examples, a method of verifying fabric connectivity with a multi-stage switch fabric having a plurality of fabric planes each having a plurality of stages to switch data units between any of a plurality of fabric endpoints comprises sending, by a fabric endpoint of the plurality of fabric endpoints to a first-stage switch of a first fabric plane of the plurality of fabric planes, a self-ping message destined for the fabric endpoint sending the self-ping message. The method also comprises sending, by the fabric endpoint in response to determining the fabric endpoint has not received the self-ping message after a predetermined time, an indication of a connectivity fault for the first fabric plane.

In some examples, a method of signaling a fabric fault for a multi-stage switch fabric having a plurality of fabric planes each having a plurality of stages to switch data units between any of a plurality of fabric endpoints comprises receiving, by a first-stage switch of a first fabric plane of the plurality of fabric planes, an indication of a fabric fault for a second fabric plane of the plurality of fabric planes, the first fabric plane different than the second fabric plane. The method also comprises sending, by the first-stage switch to a first final-stage switch of the first fabric plane, a first fault notification data unit that includes the indication of the fabric fault. The method also comprises sending, by the first-stage switch to a second final-stage switch of the first fabric plane, a second fault notification data unit that includes the indication of the fabric fault.

In some examples, a switching system includes a plurality of fabric endpoints and a multi-stage switching fabric having a plurality of fabric planes each having a plurality of stages to switch data units between any of the plurality of fabric endpoints. A fabric endpoint of the fabric endpoints is configured to send, to a switch of a first one of the stages and within a first fabric plane of the plurality of fabric planes, a self-ping message destined for the fabric endpoint. The fabric endpoint is configured to send, in response to determining the fabric endpoint has not received the self-ping message after a predetermined time, an indication of a connectivity fault for the first fabric plane.

In some examples, a switching system comprises a plurality of fabric endpoints and a multi-stage switching fabric having a plurality of fabric planes each having a plurality of stages to switch data units between any of a plurality of fabric endpoints. A first-stage switch of a first fabric plane of the plurality of fabric planes is configured to receive an indication of a fabric fault for a second fabric plane of the plurality of fabric planes, the first fabric plane different than the second fabric plane. The first-stage switch is configured to send, to a first final-stage switch of the first fabric plane, a first fault notification data unit that includes the indication of the fabric fault. The first-stage switch is configured to send, to a second final-stage switch of the first fabric plane, a second fault notification data unit that includes the indication of the fabric fault.

In some examples, a computer-readable storage medium comprises instructions for causing at least one programmable processor of a multi-stage switch fabric, having a plurality of fabric planes each having a plurality of stages to switch data units between any of a plurality of fabric endpoints, to: send, by a fabric endpoint of the plurality of fabric endpoints to a first-stage switch of a first fabric plane of the plurality of fabric planes, a self-ping message destined for the fabric endpoint sending the self-ping message; and send, by the fabric endpoint in response to determining the fabric endpoint has not received the self-ping message after a predetermined time, an indication of a connectivity fault for the first fabric plane.

In some examples, a computer-readable storage medium comprises instructions for causing at least one programmable processor of a multi-stage switch fabric, having a plurality of fabric planes each having a plurality of stages to switch data units between any of a plurality of fabric endpoints, to: receive, by a first-stage switch of a first fabric plane of the plurality of fabric planes, an indication of a fabric fault for a second fabric plane of the plurality of fabric planes, the first fabric plane different than the second fabric plane; send, by the first-stage switch to a first final-stage switch of the first fabric plane, a first fault notification data unit that includes the indication of the fabric fault; and send, by the first-stage switch to a second final-stage switch of the first fabric plane, a second fault notification data unit that includes the indication of the fabric fault.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
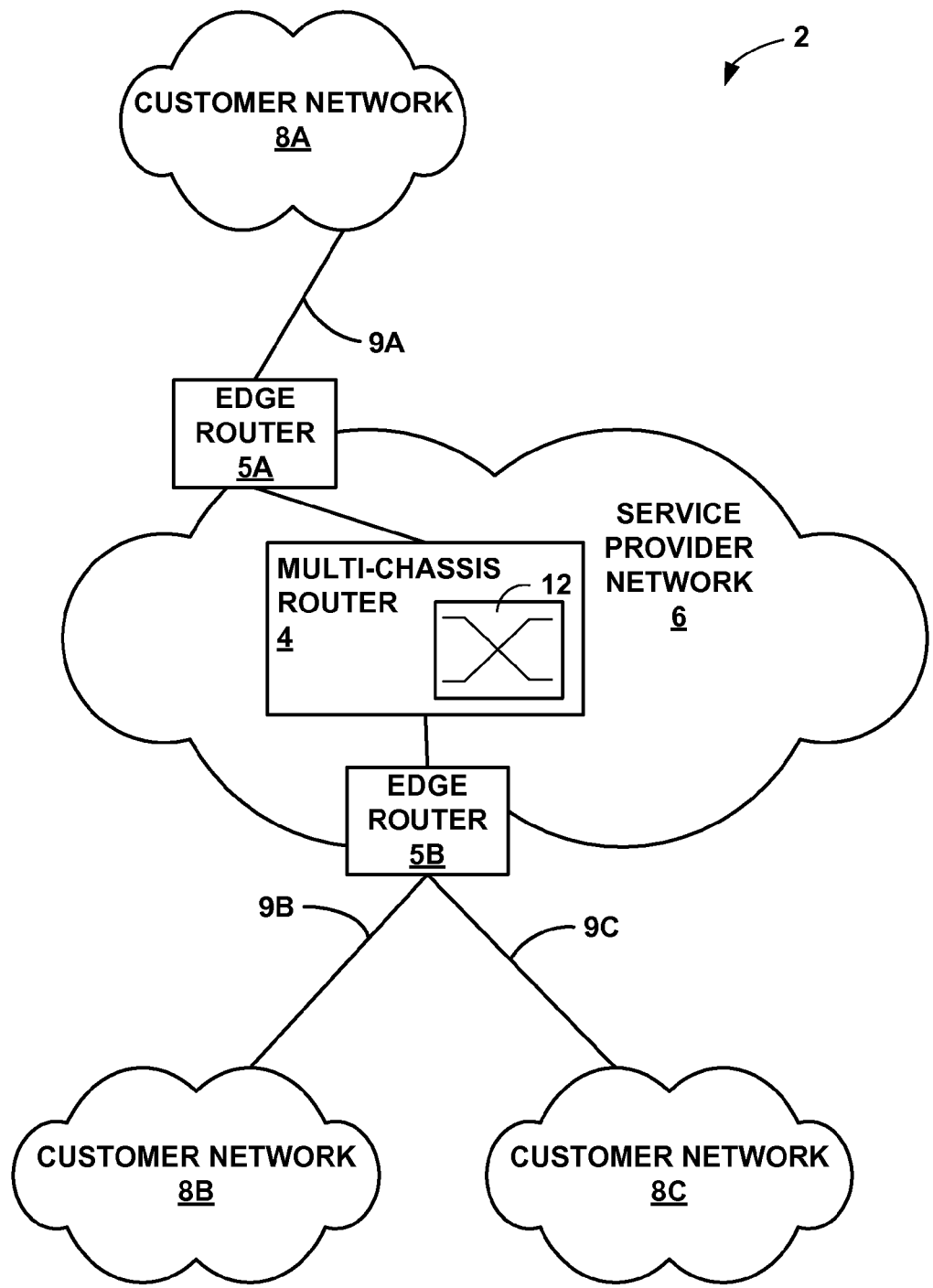
FIG. 1 is a block diagram illustrating an example network environment in which service provider network includes a multi-chassis router configured in accordance with techniques described in this disclosure.

FIG. 1 is a block diagram illustrating an example network environment in which service provider network includes a multi-chassis router configured in accordance with techniques described in this disclosure. For purposes of example, the principles of the invention are described with respect to a simplified network environment 2 of FIG. 1 in which multi-chassis router 4 communicates with edge routers 5A and 5B ("edge routers 5") to provide customer networks 8A-8C ("customer networks 8") with access to service provider network 6. Multi-chassis router 4 may exchange routing information with edge routers 5 in order to maintain an accurate representation of the topology of network environment 2. Multi-chassis router 4 may consist of a plurality of cooperative routing components operating as a single node within service provider network 6. In addition, while described with respect to multi-chassis router 4, the techniques disclosed herein are also applicable to single chassis routers and to other contexts in which a multi-stage switch fabric that switches data units is employed.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within customer networks 8 to communicate with each other. In another example, service provider network 6 may provide network services within the core of the Internet. In either case, service provider network 6 may include a variety of network devices (not shown) other than multi-chassis router 4 and edge routers 5, such as additional routers, switches, servers, or other devices.

In the illustrated example, edge router 5A is coupled to customer network 8A via access link 9A, and edge router 5B is coupled to customer networks 8B and 8C via access links 9B and 9C, respectively. Customer networks 8 may be networks for geographically separated sites of an enterprise. Customer networks 8 may include one or more computing devices (not shown), such as personal computers, laptop computers, handheld computers, workstations, servers, switches, printers, customer data centers or other devices. The configuration of network environment 2 illustrated in FIG. 1 is merely an example. Service provider network 6 may be coupled to any number of customer networks 8. Nonetheless, for ease of description, only customer networks 8A-8C are illustrated in FIG. 1. Many different types of networks besides service provider network may employ an instance of multi-chassis router 4, including customer/enterprise networks, transport networks, aggregation or access networks, and so forth.

Multi-chassis router 4 includes multiple chassis (not shown in FIG. 1) that are physically coupled and configured to operate as a single router. To edge routers 5 of network environment 2, multi-chassis router 4 appears as a single routing device. For example, although multi-chassis router 4 includes a plurality of chassis, from the perspective of peer routers 5, multi-chassis router 4 has a single network address and maintains single peer routing sessions for each routing protocol maintaining peer routing sessions with each of the edge routers 5.

As described in further detail below, the multiple routing nodes of multi-chassis router 4 forward packets, i.e., network traffic, on a data plane of multi-chassis router 4 using an internal multi-stage switch fabric 12 that interconnects fabric endpoints within the router to network interface cards (e.g., port interface cards) of the router. In the example of FIG. 1, the multi-stage switch fabric 12 switches data units from ingress ports of the network interface cards to the egress ports of the network interface cards to perform high-speed packet forwarding among and within the routing nodes of the multi-chassis router 4. Multi-stage switch fabric 12 may represent a 3-stage Clos network, a 5-stage Clos network, or an n-stage Clos network for any value of n. In general, packets received at an ingress port are divided into one or more fixed-length cells for switching. However, in some instances packets may be divided into variable-length data units for switching or switched intact as respective data units. A "data cell" or "cell" refers to a smallest block of data that is passed through the multi-stage switch fabric 12. The cell includes a header portion and a data portion. "Cell data" refers to data contained within a data portion of a cell. Additional details for example cell formats are described below with respect to FIG. 9. As used throughout this description unless specifically indicated otherwise, "cell" may refer to any data unit switched by a multi-stage switch fabric.

In accordance with the techniques of this disclosure, multi-chassis router 4 employs scalable detection and fault notification of faults affecting multi-stage switch fabric 12. In some examples, a fabric endpoint within router 4 may verify respective fabric connectivity with the switch fabric 12 by issuing self-ping data units (e.g., cells sent by the fabric endpoint and addressed to the sending fabric endpoint) to the multi-stage switch fabric 12 of multi-chassis router 4, which switches the self-ping data unit through the intermediate stages back to the issuing fabric endpoint. Self-ping data units and other data units for detecting and fault notification of faults may represent examples Operation, Administration, and Maintenance (OAM) facilities for the multi-chassis router 4. If the fabric endpoint is unable to verify connectivity, the fabric endpoint leverages the multi-stage switch fabric to notify the other fabric endpoints of the failure. In some examples, fabric endpoints or the multi-chassis fabric 12 itself may detect fabric link faults of the fabric links coupling stages of the multi-stage switch fabric 12 to one another and to the fabric endpoints. In response to detecting a link fault for a fabric plane, the fabric endpoints and multi-stage switch fabric 12 may relay and broadcast, in the data path of the multi-stage switch fabric 12, an indication of the link fault such that each of the fabric endpoints receives the indication. In response to receiving notifications of failure, the fabric endpoints may at least temporarily avoid using at least the portion of the multi-stage switch fabric 12 having connectivity fault or the link fault.

The scalable detection and fault notification techniques described above may have one or more advantages. For example, performing fault detection in the data path by the fabric endpoints rather than by a control path for multi-stage switch fabric 12 may result in earlier fault detection. Moreover, distributing the data path processing workload for fault notification within the multi-stage switch fabric 12 may scale fault notification dissemination to the fabric endpoints in such a manner as to reduce traffic black-holing until the fabric controller can re-route the multi-stage switch fabric 12. Distributed fault notification by the multi-stage switch fabric 12 to the fabric endpoints may additionally enable fault notification using a number of fault notification messages within the multi-stage switch fabric 12 that is independent of the number of fabric planes and the number of fabric endpoints, which may support a larger scale, and reduce the workload on the fabric endpoints both in terms of the number of fault notifications generated and received. Although described with respect to switch fabric 12 of multi-chassis router 4, the techniques may be applied to networks in which standalone devices, e.g., switches, are interconnected to provide a high speed switch fabric.

Figure 2:
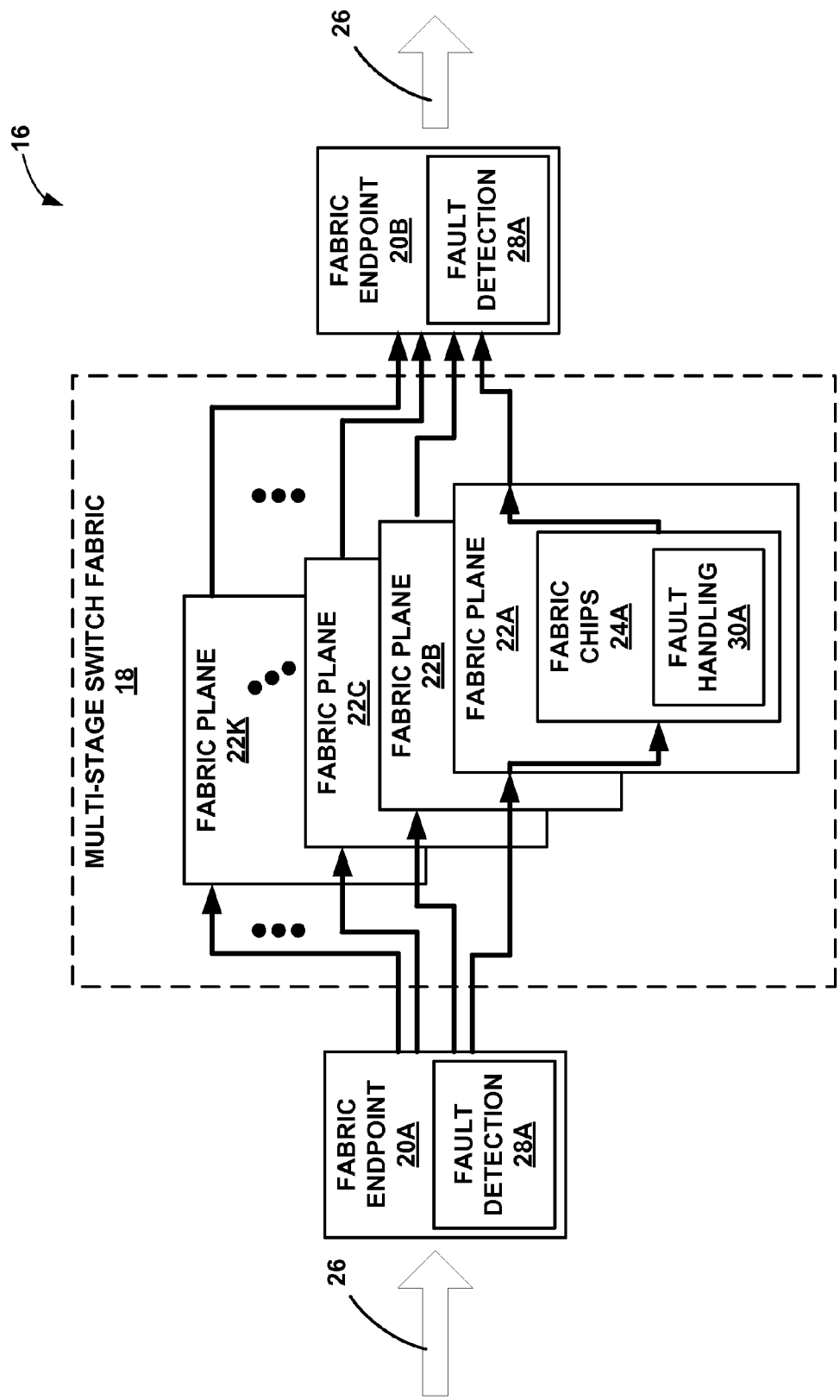
FIG. 2 is a block diagram illustrating an example of a switching system according to techniques described herein.

FIG. 2 is a block diagram illustrating an example of a switching system according to techniques described herein. Multi-stage switch fabric 18 ("fabric 18") of switching system 16 may represent an example instance of multi-stage switch fabric 12 of the multi-chassis router 4 of FIG. 1, multi-stage fabric 250 of FIG. 4, and data center fabric 514 of FIG. 10. Fabric endpoints 20A, 20B (collectively, "fabric endpoints 20") of switching system 16 and separately coupled to each of fabric planes 22A-22K of multi-stage switch fabric 18 operate as sources and/or destinations of data units (e.g., cells) switched by fabric 18. In the illustrated example, fabric endpoint 20A ingresses, originates, or otherwise sources packets 26 for switching via multi-stage switch fabric 18 to fabric endpoint 20B that egresses, consumes, or otherwise sinks packets 26.

Although each of fabric endpoints 20 typically operates as both a source and a destination for cells, any of fabric endpoints 20 may be either a source or a destination for cells in various instances. In some examples, fabric endpoints 20 may each represent a packet forwarding engine or other forwarding unit such that fabric endpoints 20 collectively implement a distributed forwarding plane for a packet switching device (e.g. multi-chassis router 4). In some examples, fabric endpoints 20 may represent fabric interfaces for servers or other hosts (e.g., virtual machines) that exchange packets for a distributed application via fabric 18. Fabric endpoints 20 may include respective switch fabric interfaces or "switch interfaces" (SIs—not shown) to provide queuing for cells being switched via fabric 18, among other operations.

In this example, multi-stage switch fabric 18 includes a plurality of operationally independent, parallel switch fabric planes 22A-22K (illustrated as "fabric planes 22A-22K") and referred to herein collectively as "fabric planes 22"). The number of fabric planes 22 may be any number, dependent upon the respective capacities of the fabric planes 22 and the fabric bandwidth needed. Fabric planes 22 may include 4, 5, or 18 planes, for instance. In some examples, fabric plane 22K operates as a backup or spare fabric plane to the remaining fabric planes 22. Each of fabric planes 22 includes similar components for implementing an independent Clos or other multi-stage switch network (e.g., Benes network) to provide independent switching bandwidth to fabric endpoints 20, said components and functionality being described hereinafter primarily with respect to fabric plane 22A. Fabric planes 22 are operationally independent in that a failure of one of fabric planes 22 does not affect the switching ability of the remaining, operational fabric planes. Each of fabric planes 22 may provide non-blocking connectivity. Additional details regarding an example of a multistage switch fabric having a plurality of switch planes are found in Pradeep S. Sindhu, U.S. Pat. No. 7,102,999, entitled "Switching Device" and filed Nov. 24, 1999, which is incorporated by reference in its entirety.

Each of fabric planes 22 includes an input port coupled to fabric endpoint 20A and an output port coupled to fabric endpoint 20B. Although only one ingress fabric endpoint 20A and one egress fabric endpoint 20B is illustrated for simplicity, each fabric plane 22 typically includes multiple input ports and output ports coupled to respective fabric endpoints. When a fabric endpoint 20A obtains a packet, the fabric endpoint 20A performs a lookup operation to determine fabric endpoint 20B (in this example) is a destination for the packet. Obtaining a packet may refer to receiving a packet from the network or host, or originating a packet, for example. Fabric endpoint 20A optionally divides the packet into cells and forwards the packet/cells across multi-stage fabric 18 to fabric endpoint 20B. Fabric endpoint 20A selects different fabric planes 22 to switch the cells to distribute the bandwidth load across the fabric planes 22.

Fabric endpoints 20A, 20B may employ a request/grant protocol to transmit a data cell across fabric 18. In such cases, source fabric endpoint 20A transmits a request across fabric 18 to the destination fabric endpoint 20B. Fabric endpoint 20A transmits each such request across a different one of fabric planes 22 in a round-robin or other balancing order to fairly distribute the transport load. In response to receiving the request, fabric endpoint 20B transmits a grant to the fabric endpoint 20A across the same fabric plane 22 on which fabric endpoint 20B received the corresponding request. In response to receiving the grant, fabric endpoint 20A transmits the data cell to the fabric endpoint 20B across the same fabric plane 22 on which fabric endpoint 20A issued the corresponding request.

As noted above, each of fabric planes 22 may include similar components to perform similar multi-stage switch functionality. Fabric plane 22A, as an example, includes a plurality of fabric chips 24 coupled by fabric chip-to-chip links (CCLs—not shown) to implement a multi-stage switch fabric for the fabric plane 22A. Fabric chips 24A may be distributed among various switching devices, chassis, etc., of the switching system 16. Each of fabric chips 24A may include an application-specific integrated circuit (ASIC) and may be referred to as a "fabric ASIC."

In accordance with techniques described herein, fabric endpoint 20A includes fault detection module 28A to generate and receive self-ping cells to verify per-plane connectivity for the fabric endpoint 20A with respect fabric planes 22. Fabric chips 24A include a fault handling module 30A, which may include logic distributed among the various fabric chips 24A. Fault detection module 28A, upon determining a connectivity fault with fabric plane 22A, e.g., sends an indication of the connectivity fault to the fabric plane 22A. This indication may be a cell specially-generated by fault detection 28A. In addition, fabric endpoint 20A may at least temporarily modify its operation to avoid transmitting cells to other fabric endpoints 20 on the fabric plane 22A.

On receiving the indication of a connectivity fault via an input port to fabric plane 22A, fault handling module 30A distributes the indication among the fabric chips 24A, which send indications of the connectivity fault to other fabric endpoints 20 via output ports of the fabric plane 24A. In this way, fault detection module 28A and fault handling module 30A of fabric plane 22A may cooperatively identify and distribute, in the data path and in a distributed manner, indications of a connectivity fault for fabric endpoint 20A with respect to fabric plane 22A. In response to receiving an indication of the connectivity fault, other fabric endpoints 20 may avoid using fabric plane 22A to transmit cells to fabric endpoint 20A.

Fault detection module 28A may determine the connectivity fault by determining that a self-ping cell sent was not received within an expected time. In some instances, fault detection module 28A may only declare a connectivity fault after a number of consecutive such failures to receive a self-ping cell previously sent by fault detection module 28A. Fault detection module 28A may generate and send self-ping cells to fabric planes 22A according to a defined period. Fault detection module 28A may generate and send self-ping cells on a per-plane basis, i.e., fault detection module 28A may perform the operations described above with respect to each of fabric planes 22 in order to verify connectivity with all fabric planes 22.

In some examples, fault detection module 28A or fault handling module 30A may receive and handle an indication of a failed chip-to-chip link coupling fabric endpoint 20A to one of fabric chips 24A or coupling two of fabric chips 24A. In response to receiving a link fault for fabric plane 22A, e.g., fabric endpoint 20A and/or fault handling module 24A may relay and broadcast, in the data path, an indication of the link fault to fabric chips 24A such that each of the fabric endpoints 20 receives the indication of the link fault. In response to receiving notifications of the link fault, the fabric endpoints 20, including fabric endpoint 20A and fabric endpoints seeking to transmit cells to fabric endpoint 20A, may at least temporarily avoid using at least the portion of fabric plane 22A having the link fault.

Figure 3:
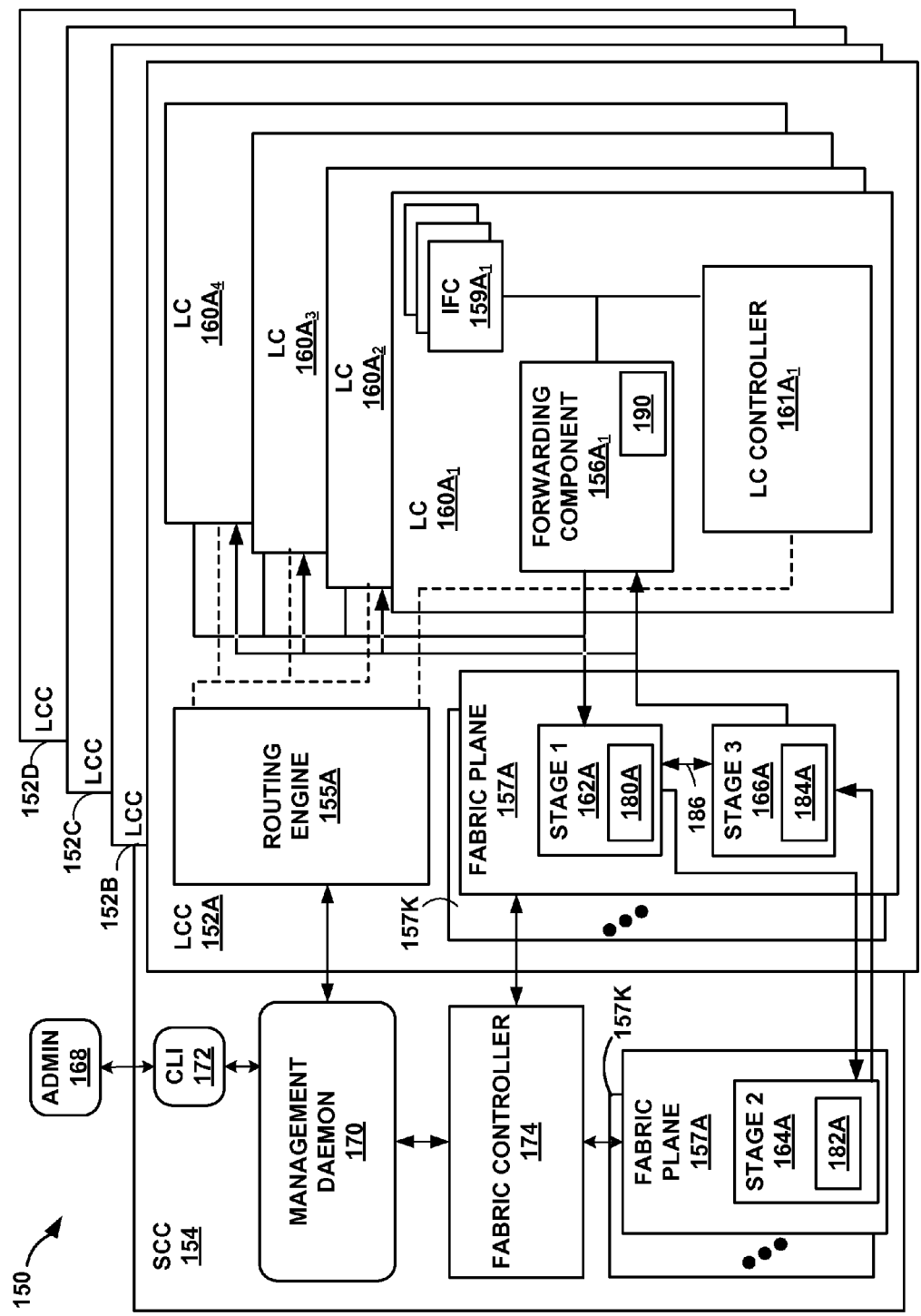
FIG. 3 is a block diagram illustrating of a multi-chassis router according to one aspect of the disclosure.

FIG. 3 is a block diagram illustrating of a multi-chassis router according to one aspect of the disclosure. The techniques described herein for fault detection and distributed fault notification may be implemented in the multi-chassis router 150 of FIG. 3. In the example of FIG. 3, multi-chassis router 150 includes a detailed view of a line-card chassis (LCC) 152A, which represents one chassis of the multi-chassis router 150. Multi-chassis router 150 routes data between network devices across a network. Multi-chassis router 150 may, for example, represent an example of multi-chassis router 4 of FIG. 1 in further detail. Again, while described for purposes of illustration with respect to a multi-chassis router having distributed line-card chassis each coupled to one or more switch card chassis, the techniques of this disclosure are applicable to any single or multi-chassis network device or network switching fabric that switches data units among a large number of fabric endpoints.

As shown in FIG. 3, multi-chassis router 150 includes a plurality of cooperative routing components operating as a single node within the network. In this example, multi-chassis router 150 comprises four substantially identical LCCs 152B-152D ("LCCs 152") and a switch card chassis (SCC) 154 (or more simply, "switch chassis 154"). In other embodiments, a multi-chassis router may include more or fewer LCCs. SCC 154 may operate as a central routing node to connect the LCCs 152.

Each of LCCs 152 may be contained within a physically separate chassis and may include a CPU (only CPU 155A of LCC 152A is shown) having a fabric management module (only fabric management module 158A of LCC 152A is shown), switch fabric (only switch fabric 157 of LCC 152A is shown), a forwarding component set (only forwarding component set 156A$_1$ of LCC 152A is shown), and a set of network interfaces (not shown). SCC 154 comprises a centralized routing engine (not shown) connected to each of the CPUs 155 of the LCCs 152 via links (not shown).

The other routing nodes, i.e., LCCs 152B-152D, are typically similar to LCC 152A. In this example, LCC 152A includes CPU 155A and four line cards (LCs) 160A$_1$-160A$_4$ ("LCs 160A"). Each LC 160A within LCC 152A includes a forwarding component. Each LC 160A further comprises a set of interface cards (IFCs) 159A that provide physical interfaces for receiving from and sending packets to an external network (only IFC 159A$_1$ is shown). LCs 160A each also include an LC controller 161A (only LC controller 161A$_1$ is shown) that performs control functions within an LC 160A according to instructions from routing engine 155A.

A routing engine of SCC 154 (not shown) maintains routing information that describes a topology of a network, and derives a forwarding information base (FIB) in accordance with the routing information. The routing engine of SCC 154 copies the FIB to each routing engine of the LCCs 152, e.g., to routing engine 155A of LCC 152A. Routing engine 155A then copies the FIB to forwarding component sets 156A in LCs 160A. An ingress forwarding component (any of forwarding components 156) uses the FIB to direct data arriving from the network (not shown) to the proper egress forwarding component (also any of forwarding components 156). The egress forwarding component relays the data to the network. The FIB in each of forwarding components 156 may be updated without degrading packet forwarding performance of multi-chassis router 150 because FIB updates are distributed separately from the data packets. Alternatively, the routing engine of SCC 154 may derive separate FIBs which are copied to respective forwarding components 156.

In some examples, administrator 168 ("ADMIN 168") interacts with management daemon 170 of SCC 154 via a command line interface (CLI) 172 to perform various management tasks using management daemon 170. Management daemon 170 may provide configuration information for configuring fabric planes 157 to fabric controller 174. Fabric controller 174 configures the individual fabric chips making up fabric planes 157, as described in further detail below. For example, fabric controller 174 may modify a spray configuration of each fabric chip.

Each of forwarding component sets for LCs 160 in the LCCs 152, i.e., forwarding component sets 156A$_1$-156A$_4$, 156B$_1$-156B$_4$, ..., 156D$_1$-156D$_4$ (collectively, "forwarding component sets 156") includes one or more forwarding components that collectively implement portions of a data or forwarding plane for router 150. A forwarding component represents a hardware-based packet processor that provides high-speed forwarding of network traffic. A forwarding component may represent a packet-forwarding integrated circuit (IC), e.g., one or more programmable ASICs or ASIC-based packet processors, that processes network packets by performing a series of operations on each packet over respective internal packet forwarding paths as the packets traverse the internal architecture of router 150, e.g., via fabric planes 157. A forwarding component may process packets in accordance with a forwarding information base provided by one of routing engines 155. In some examples, a forwarding component may be referred to as a packet forwarding engine.

Each forwarding component in forwarding component sets 156 may connect to one or more network interfaces. For example, a forwarding component may send and receive information packets for two network interfaces, e.g., IFCs 159A$_1$ and IFCs 159A$_2$ from FIG. 3. An LCC 152 having sixteen forwarding components with two network interfaces per forwarding component would have a total of thirty-two network interfaces.

Each of forwarding components 156 is connected to each of fabric planes 157. Each active fabric plane of fabric planes 157 is responsible for providing a portion of the required internal switch bandwidth of multi-chassis router 150. By dividing the data into cells and transmitting the data on a cell-by-cell basis over the active switch planes, forwarding components 156 may load-balance traffic across the active fabric planes 157.

A forwarding component of forwarding component set $156A_1$ may receive, via one of IFCs $159A_1$ on LC $160A_1$, an incoming packet. The forwarding component determines if the packet is to be switched to one a forwarding component that is not one of forwarding component set $156A_1$ and thus located on a different LC 160, according to a FIB provided by routing engine 155A. If so, the forwarding component divides the packet into data cells and sends the data cells to fabric planes 157A for switching to a different LC 160 and one of forwarding components 156. A forwarding component 156 that receives data cells for a packet reassembles the packet and outputs the packet via the corresponding one of IFCs 159 for the forwarding component.

In multi-chassis router 150, each of fabric planes 157A-157K (collectively, "fabric planes 157") provides an operationally independent multi-stage switch fabric. Fabric planes 157 may represent example implementations of fabric planes 22 of FIG. 2. Fabric plane 157A, e.g., may be implemented by dedicated switch cards inserted within SCC 154 and within each of LCCs 152 (switch cards not shown). For example, a switch card from SCC 154 may include logic to implement intermediate stages of the multi-stage switch fabric for fabric plane 157A (shown in FIG. 3 as a single intermediate stage 2 164A and alternatively referred to as "F2" for a 3-stage Clos network, or as "intermediate-stage"), and a switch card from LCC 152A (as well as the other LCCs 152) may include logic to implement the first and final (alternatively, "F1" and "F3" for a 3-stage Clos network) stages, stage 1 162A and stage 3 166A respectively, for fabric plane 157A. Thus, in some examples, one switch card from each of LCCs 152 and one SCC switch card from SCC 154 form a fabric plane 157. In some examples, either or both of stage 1 162A and stage 3 166A may be located on either LCC 152A or SCC 154.

Switch cards of SCC 154 and LCCs 152 may include switch interface boards (SIBs) or other switch cards, for instance, that include one or more fabric chips and a set of optical or other high-speed interfaces that provide connectivity between SCC 154 and LCCs 152. In this embodiment, each switch card for the LCC portion of fabric plane 157A is connected to a single switch card for the SCC portion of fabric plane 157A. A separate link connects each SCC switch card to each multi-chassis switch card. For example, links (not shown) may consist of separate fiber-optic array cables for each of the fabric planes 157. If multi-chassis router 150 has five fabric planes 157, for example, a total of twenty cables may be used to interconnect switch cards implementing the various fabric planes 157.

Stage 1 162A may be referred to as a first stage, first-stage, ingress stage, F1, or stage 1, for instance. Because fabric plane 157A is a 3-stage switching fabric, stage 3 166A may be referred to as a third sage, third-stage, final/last stage, final-stage, egress stage, F3, or stage 3, for instance. For n-stage fabrics with n other than 3, the nomenclature will be correspondingly different, e.g., "F5" for the final stage. Other fabric planes 157 may be implemented by similar, separate switch cards to provide operational independence. Each of stage 1 162A, stage 2 164A, and stage 3 166A may be implemented by one or more fabric chips, such as fabric chips 24 of FIG. 2. A stage 1 162A switch and corresponding stage 3 166A switch may be located on a same device or component and coupled by a mate link 186 that enables direct communication between these two switches.

As noted above, each of fabric planes 157 form a three-stage switch fabric. For example, the three-stage switch fabric may be a Clos network including multiple crossbar switches in each stage. In some embodiments, each of LCCs 152 includes a portion of each of the three stages. In other embodiments, switch cards for fabric planes 157 of LCCs 152 may perform the first and third stages, while switch cards in fabric planes 157 of SCC 154 perform the second stage of a three-stage network. As shown on the fabric plane 157A of LCC 154A, data cells to be relayed from $LC160A_1$ are first sent to stage 1 162A for transmission to a stage 2 164A of fabric plane 157A of SCC 154. Each of stage 1 162A, stage 2 164A, and stage 3 166A may include one or more crossbar switches or other switches. Stages for other fabric planes 157 may be similar to those of fabric plane 157A.

Stage 1 162A switches a data cell via interconnecting links to the stage 2 164A, which is located internal to fabric plane portion 157A of SCC 154. Stage 2 164A not only receives data cells from stage 1 162A switches on LCC 152, but also from similar stage 1 switches located on LCCs 152B-152D. In other words, each of LCCs 152 has at least one stage 1 switch for each of fabric planes 157. Similarly, each of LCCs 152 has at least one stage 3 switch for each of fabric planes 157. Stage 2 164A switches data cells to stage 3 166A switches located on any of LCCs 152.

One or more stage 3 switches 166A include discrete outputs (not shown) connecting to each of forwarding components 156A on LCC 152A. A cell received by a stage 3 166A switch is directed to the forwarding component 156A corresponding to the set of IFCs 159A as required by the destination of the data unit.

Forwarding components 156 and fabric chips that implement stages of fabric planes 157 perform techniques described herein for fault detection and distributed fault notification. Each of forwarding components 156 may represent an example of instance of a fabric endpoint 20, fabric planes 157 may represent example instances of fabric planes 22, and the stages of fabric planes 157 (e.g., stage 1 162A, stage 2 164A, and stage 3 166A of fabric plane 157A) may represent example fabric chips 24A, all of FIG. 2.

As an exemplary illustration, forwarding component $156A_1$ includes fault detection module 190 that may represent an example instance of fault detection modules 28 of FIG. 2. That is, fault detection module 190 may perform any of the techniques described herein performed by a fabric endpoint to detect and handle faults within the fabric planes 157 or with links connecting forwarding component $156A_1$ to fabric planes 157. Likewise, each of stage 1 162A, stage 2 164A, and stage 3 166A include a fault handling module. Stage 1 162A includes fault handling module 182A, stage 2 164A includes fault handling module 180A, and Stage 3 166A includes fault handling module 184A. Fault handling modules 180A, 182A, 184A may each represent an example instance of fault handling modules 30 of FIG. 2. That is, fault handling modules 180A, 182A, 184A may perform any of the techniques described herein performed by a stage (or stage switch) to detect and distribute fault indications for fabric planes 157 to the various forwarding components 156.

In some examples, fault handling modules 180A, 182A, 184A determines and handles indications of a failed chip-to-chip link coupling a forwarding component 156 to forwarding planes 157 or coupling any two stages of any of forwarding planes 157.

Additional details regarding an example of a multi-chassis router having a multi-stage switch fabric are found in Pradeep S. Sindhu, U.S. Patent Publ. No. 2008/0044181 A1, entitled "Multi-chassis router with multiplexed optical interconnects" and published Feb. 21, 2008, which is incorporated by reference in its entirety.

Figure 4:
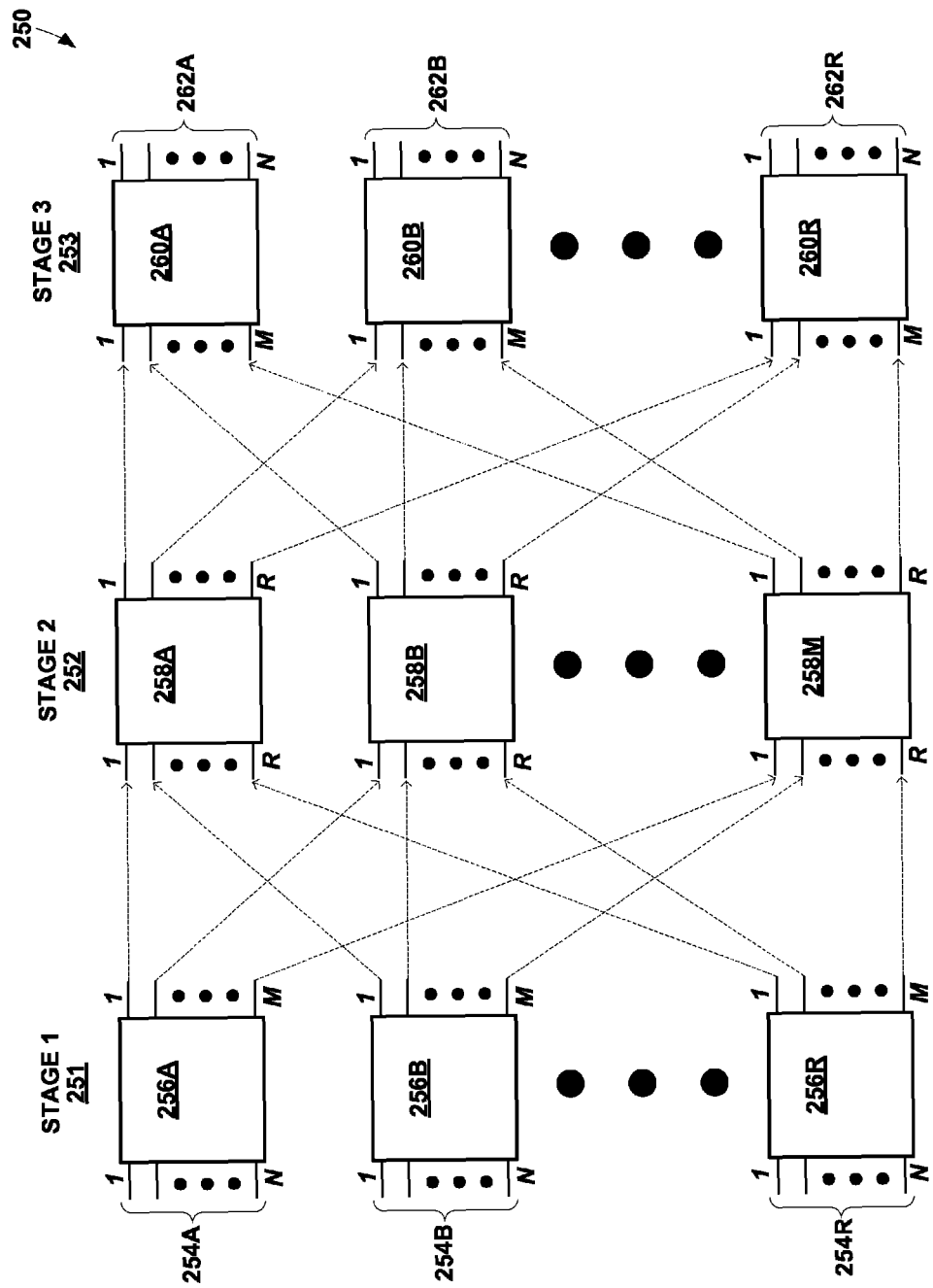
FIG. 4 is a block diagram illustrating a logical representation of a three-stage switching network that operates in accordance with techniques described herein.

FIG. 4 is a block diagram illustrating a logical representation of a three-stage switching network 250 (or "switch fabric 250") that operates in accordance with techniques described herein. Three-stage network 250 may logically represent switch fabric 12 of FIG. 1, switch fabric 18 of FIG. 2, and any of switch fabrics 157 of FIG. 3 or any other switch fabric in which components or devices are interconnected to provide a multi-stage switch fabric. The three stages of the example network 250 of FIG. 4 include: stage 1 251 consisting of crossbar switches 256A-256R (collectively "switches 256"), stage 2 252 consisting of crossbar switches 258A-258M (collectively "switches 258"), and stage 3 consisting of crossbar switches 260A-260R (collectively "switches 260"). Switches 256 receive data packets via inputs 254A-254N (collectively "inputs 254"); there are a total of N×R inputs 254 in this example. Switches 260 send the data packets via output ports 262A-262N (collectively "outputs 262"); there are a total of N×R outputs 262 in this example.

As shown in FIG. 4, stage 1 251 and stage 3 253 each include R crossbar switches, while stage 2 252 includes M crossbar switches. Three-stage network in coupled to N inputs and N outputs, thus completing the characterization of the Clos network. The integer values for M and N define blocking characteristics of three-stage switching network 250. For example, stage 2 252 may include more crossbar switches than stage 1 251 and stage 3 253 (i.e., M>R) to reduce or eliminate the possibility that an open one of inputs 254 could be blocked from an open one of outputs 262.

Each of switches 256, 258, 260 may be implemented by a fabric chip. In some cases, corresponding stage 1 switches 256 and stage 3 switches 260 (e.g., switch 256A and switch 260A) may be implemented by a same fabric chip. As described with respect to multi-chassis router 150 of FIG. 3, stage 1 251 and stage 3 253 may be located in a plurality of LCCs, while stage 2 252 is located in an SCC.

To establish a path through network 250 from one of inputs 254 to the intended output 262, the one of switches 256 associated with the receiving input 254 determines an available stage 2 252 switch 258 that allows a connection path to the stage 3 253 switch 260 including the intended output 262. For example, assume a packet received by switch 256A is to be relayed to one of outputs 262A on switch 260A. Switch 256A selects any of switches 258 with an open connection to both switch 256A and switch 260A. Assume switch 256A selects switch 258B. Once switch 258B receives the data packet, switch 258B determines an available path to switch 260A and forwards the data packet to switch 260A. For example, switch 258B may have more than one open path to switch 260A.

In accordance with techniques described herein, each of switches 256, 258, 260 may include an instance of fault handling module 30 for determining and distributing indications of fabric connectivity and link faults to fabric endpoints 20 coupled to the network 250.

While generally described as a three-stage switch network such as network 250, in other examples fabric planes described herein may contain different switch architecture. For example, the second stage in a three-stage network may be replaced with another three-stage network, thereby forming a five-stage network. Other switch fabric architecture is also possible.

Figure 5:
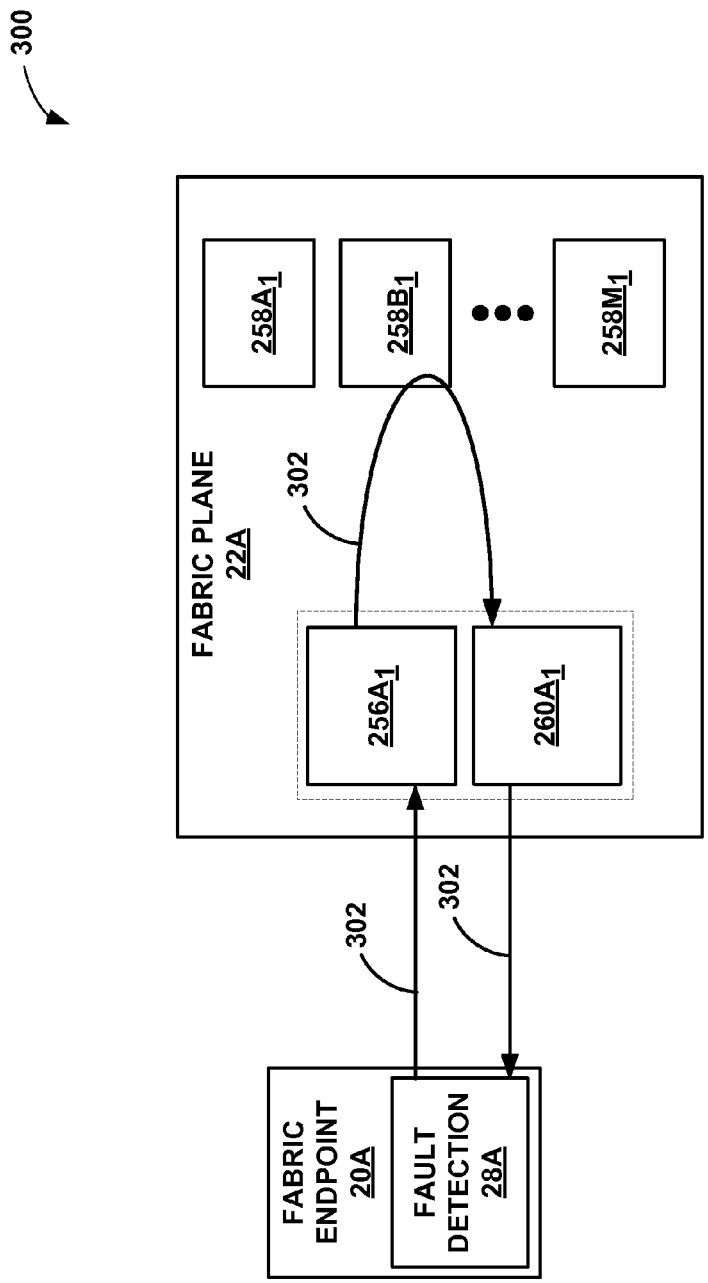
FIG. 5 is a block diagram illustrating an example switching system in which a fabric endpoint verifies connectivity according to techniques described herein.

FIG. 5 is a block diagram illustrating an example switching system in which a fabric endpoint verifies connectivity according to techniques described herein. Switching system 300 includes fabric endpoint 20A and fabric plane 22A. Fabric plane 22A is, in this example, includes a three-stage switching network such as network 250 of FIG. 4 having stage 1 switches $256A_1$-$256R_1$, stage 2 switches $258A_1$-$258M_1$, and stages 3 switches $260A_1$-$260R_1$. The subscript identifies the fabric plane 22 (subscript 1 for fabric plane 22A, subscript 2 for fabric plane 22B, and so on).

For ease of illustration purposes, a single path through stage 1 switch $256A_1$, stage 2 switch $258B_1$, and stage 3 switch $260A_1$ of fabric plane 22A is shown. Although only stage 2 switch $258B_1$ is shown, self-ping cell 302 may in various cases be switched through any of stage 2 switches $258A_1$-$258M_1$. Switch $256A_1$ and switch $260A_1$ may be located on a same device or component (e.g., an LCC) and coupled by a "mate link" that enables direct communication between these two switches.

To detect plane-level fabric faults for fabric endpoint 20A with fabric plane 22A, fault detection module 28A generates a self-ping cell 302, so-named because the self-ping cell 302 is addressed to fabric endpoint 20A, and sends the self-ping cell 302 to stage 1 switch $256A_1$ coupled to fabric endpoint 20A. Because the self-ping cell 302 is addressed to fabric endpoint 20A, fabric plane 22A switches the self-ping cell 302 to fabric endpoint 20 through stage 2 switch $258B_1$ (or other suitable stage 2 switches in other cases) to stage 3 switch $260A_1$, which outputs the self-ping cell 302 to fabric endpoint 20A. If fault detection module 28A fails to receive the self-ping cell 302 within a predetermined time after sending the self-ping cell 302, fault detection module 28A may declare a timeout error, which may indicate a fabric connectivity fault. The predetermined time may be 100 μs, for instance. Although only shown with respect to fabric plane 22A, fault detection module 28A generates, sends, and receives similar self-ping cells on each of the fabric planes 22 to verify fabric connectivity for the fabric endpoint 20A at least with respect to respective portions of the fabric planes 22. However, because each fabric endpoint 20 coupled to each of fabric planes 22 may perform similar self-ping operations, the combination of all such self-ping operations and the distribution of an indication of fabric connectivity faults to all fabric endpoints 20 allows the fabric endpoints to at least temporarily modify their switching operations to avoid the fabric connectivity faults occurring anywhere in fabric 22.

Fault detection module 28A may be executed by a dedicated processing thread to facilitate uninterrupted fabric connectivity fault detection and handling. Fault detection module 28A may generate and send the self-ping cell 302 periodically, and declare a connectivity fault only on the occurrence of consecutive timeout errors. Because traffic blackholing for a high-bandwidth switching system may lead to the loss of many Gigabits of data, the ping period may be sub-millisecond facilitate rapid detection of fabric connectivity faults for fabric endpoint 20A. While fault detection module 28A may declare a connectivity fault only on the occurrence of consecutive timeout errors, fault detection module 28A may nevertheless notify a control path module that controls fabric plane 22A in order to report a health of the fabric plane 22A. For example, fault detection module 28A may report a number of timeout errors experienced by fabric endpoint 20 over a time period. The control path module may reroute fabric plane 22A or take other actions in response to frequent and regular timeout errors, which may indicate a partial loss of connectivity on fabric plane 22A.

Figure 6A:
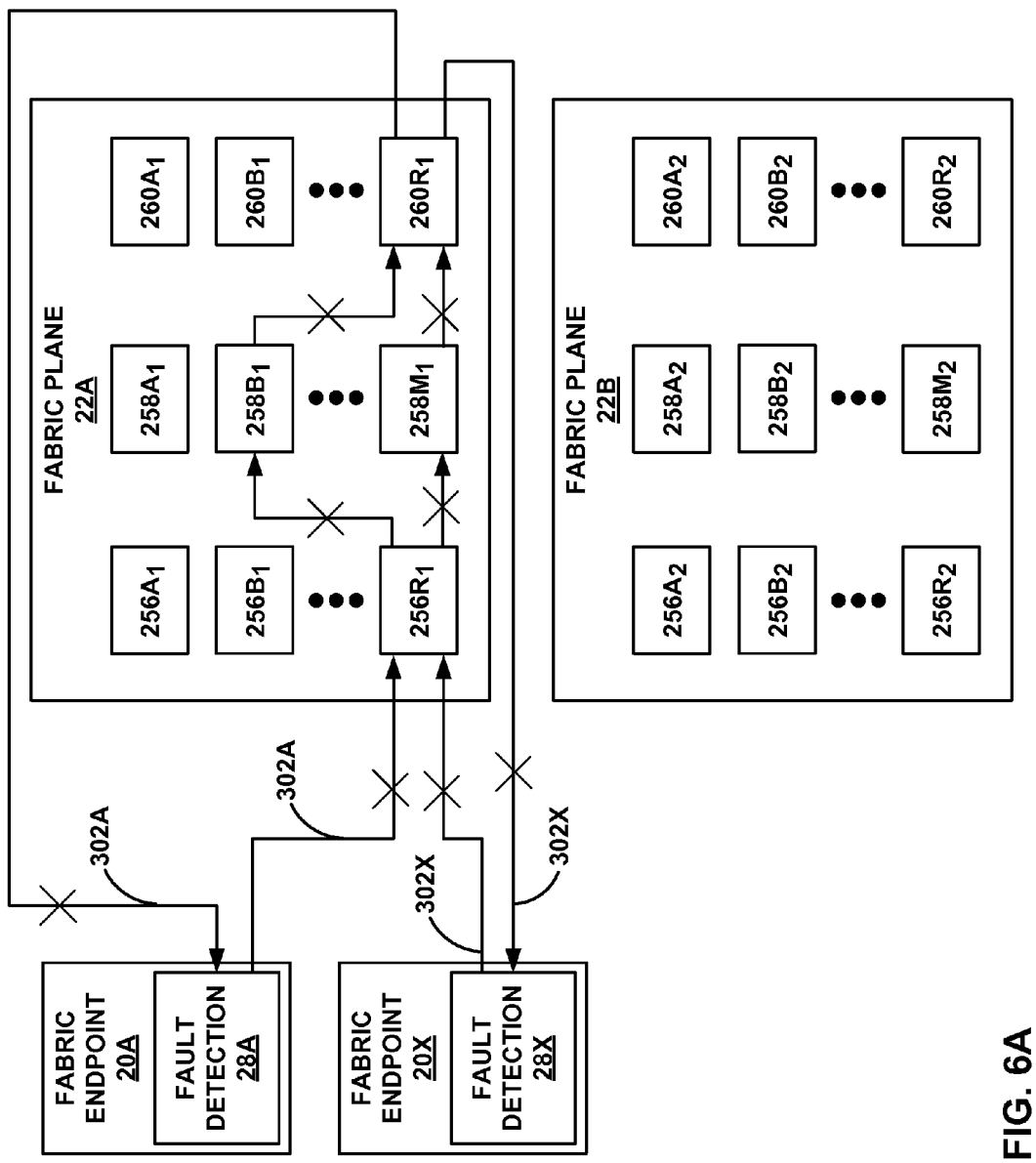
FIGS. 6A-6C are block diagrams depicting fabric fault detection and distribution of an indication of fabric faults by a fabric plane, in accordance with techniques described in this disclosure.
Figure 6B:
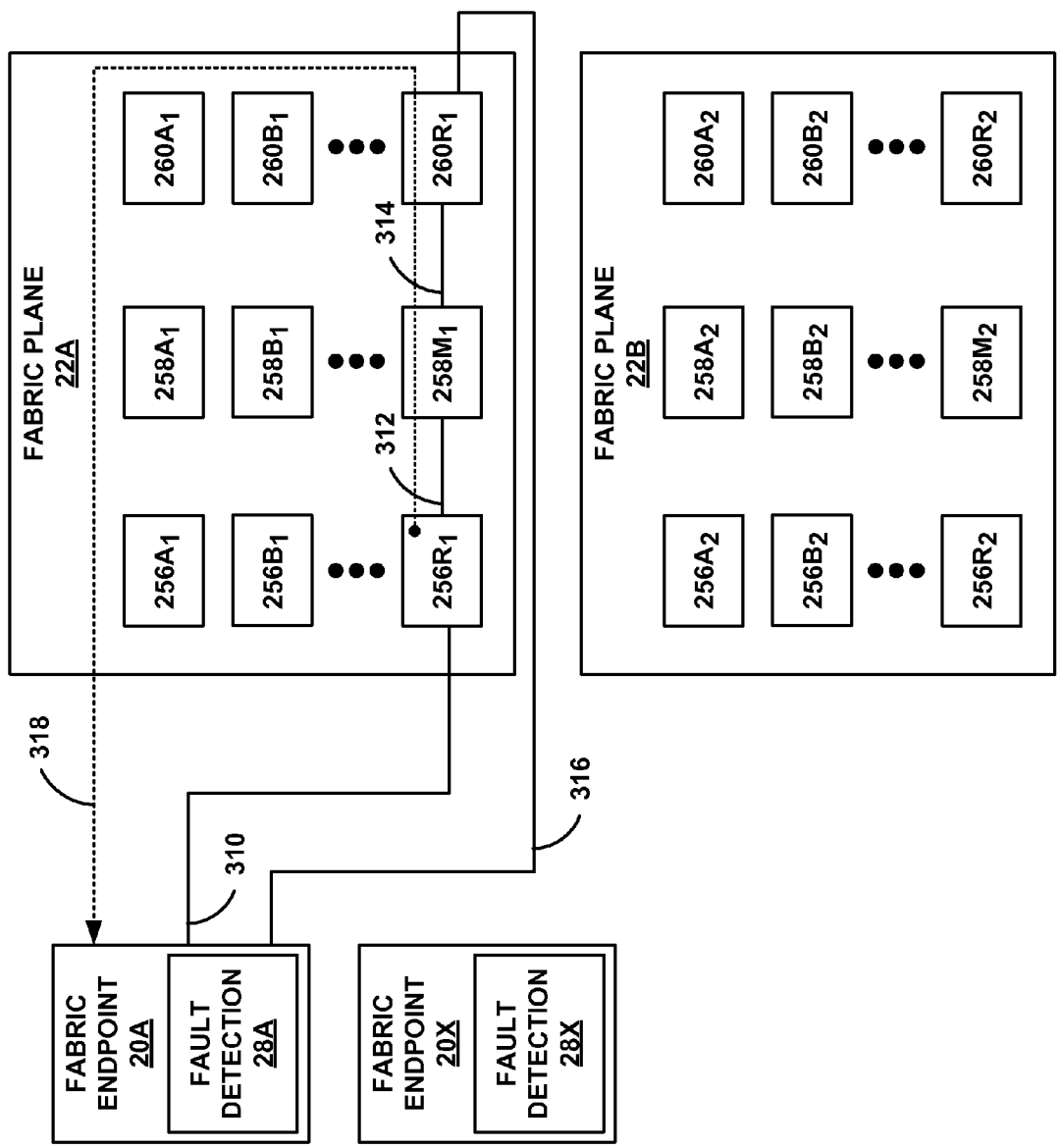
Figure 6C:
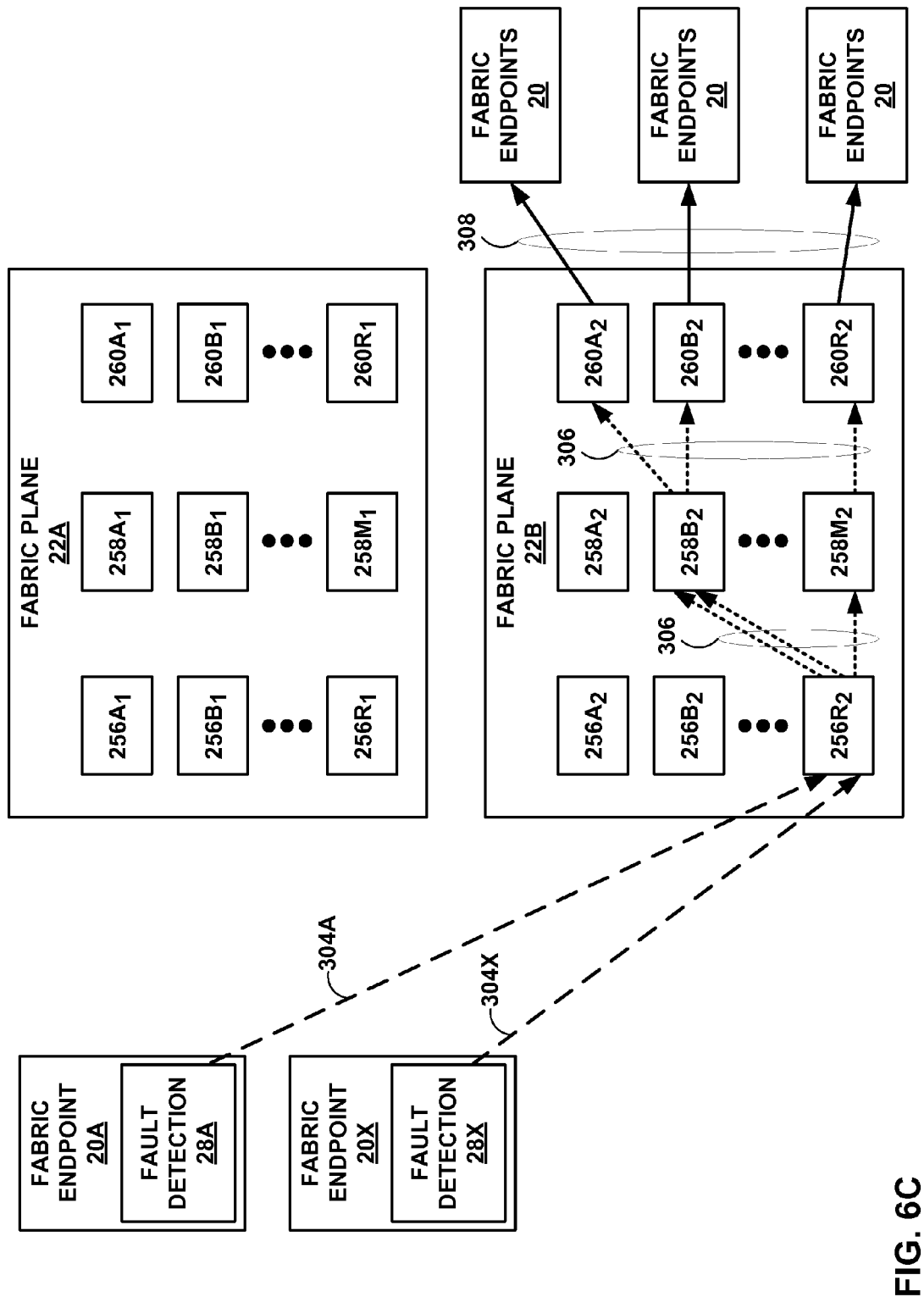

FIGS. 6A-6C are block diagrams depicting fabric fault detection and distribution of an indication of such fabric faults by a fabric plane, in accordance with techniques described in this disclosure. FIG. 6A shows fabric planes 22A, 22B each having a three-stage switching network, which may be an example of network 250 described in FIG. 4. While described with respect to three-stage switching networks, the techniques describe herein are applicable to 5-stage and other n-stage switching networks, where n>=3. The subscript for the various switch reference characters identifies the fabric plane 22 (subscript 1 for fabric plane 22A, subscript 2 for fabric plane 22B, and so on). Each of the stage switches may include an example instance of a fault handling module 30, or an example instance of fault handling modules 180A, 182A, 184A corresponding to the appropriate stage, for effectuating the techniques described herein.

Fault detection modules 28A, 28X of respective fabric endpoints 20A, 20X generate and send respective self-ping cells 302A, 302X to attempt to verify fabric connectivity with fabric plane 22A. Neither of fault detection modules 28A, 28X receives self-ping cells 302A, 302X and each declares a timeout error for those self-ping cells. The timeout error may cause the fault detection modules 28A, 28X to declare respective fabric connectivity faults (e.g., if the latest timeout error meets a threshold number of consecutive errors indicative of a fabric connectivity fault).

FIG. 6B shows that fabric endpoint 20A is coupled to a stage 1 switch $256R_1$ via link 310 and to stage 3 switch $260R_1$ via link 316. In addition, link 312 couples stage 1 switch $256R_1$ to stage 2 switch $258M_1$, and link 314 couples stage 2 switch $258M_1$ to stage 3 switch $260R_1$.

Link 310 represents a fabric endpoint to stage 1 switch link (hereinafter a "FE→F1" link). Link 312 represents a stage 1 switch to stage 2 switch (hereinafter a "F1→F2" link). Link 314 represents a stage 2 switch to stage 3 switch (hereinafter a "F2→F3" link). Link 316 represents a stage 3 switch to fabric endpoint link (hereinafter a "F3→FE" link) Each of links 310, 312, 314, 316 may be referred to as a chip-to-chip link (CCL), and each may include a high-speed optical link. Although FIG. 6B only shows links for a single path from a fabric endpoint 20A through fabric plane 22A and back, the switching system includes similar links for each fabric endpoint 20 and stage switch, as illustrated, e.g., with respect to multi-stage fabric 250 of FIG. 4.

Each receiver (or "CCL receiver") of data cells communicates receive link ("Rx link" or "in-link") status to each sender (or "CCL sender") of data cells for the link (or "CCL link") connecting the sender to the receiver. Example status information may include link up, link down, and link fault. Upon detecting a link fault on the link, the receiver may send an indication of the link fault to the sender.

For example, fabric endpoint 20A is a sender for link 316 for which stage 1 switch $256R_1$ is a receiver. Stage 1 switch $256R_1$ may detect a link fault on link 310 and send fault message 318 that includes an indication of the link fault on link 310 to fabric endpoint 20A. In the illustrated example, fault message 318 is a specially-generated data cell sent via the data path through fabric plane 22A. In some cases, a control module for fabric plane 22A sends the indication of the link fault on link 310 to fabric endpoint 20A. Indications of links faults on links 312, 314, and 316 may be propagated similarly to the indication of the link fault on link 310. However, in some cases, stage 1 switch $256R_1$ may directly communicate a fault to corresponding stage 3 switch $260R_1$ via the mate link coupling these switches, which may be a dedicated flow control CCL link.

Turning to FIG. 6C, in response to obtaining an indication of a fault, either by fault detection module 28A detecting a fault using self-ping cells or by receiving an indication of a link fault, fabric endpoint 20A at least temporarily ceases spraying cells to fabric plane 22A. As used herein, the term "spraying" a data unit refers to selecting, by a fabric stage switch, an output port for a data unit and sending the data unit on the output port. For example, fault detection module 28A may modify the spray programming for fabric endpoint 20A for all destinations (e.g., all other fabric endpoints in the switching system) such that fabric endpoint 20A no longer sends cells across fabric plane 22A. Fault detection module 28A additionally initiates notifying all fabric endpoints 20 that are reachable by one of remaining active fabric planes 22 (i.e., not fabric plane 22A in this example) of the fabric connectivity fault for fabric endpoint 20A. In particular, fault detection module 28A sends a fault data unit 304A that indicates a connectivity fault to stage 1 switch $256R_2$ of active fabric plane 22B. Fault detection module 28A may additionally notify the fabric management software or other control path component for fabric planes 22 of the fault for fabric endpoint 20A.

Fault detection module 28X performs similar operations in response to detecting the connectivity fault as those described above with respect to fault detection module 28A, including sending fault data unit 304X that indicates a connectivity fault to stage 1 switch $256R_2$ of active fabric plane 22B. Both fabric endpoint 20A and 20X are coupled to inputs of stage 1 switch $256R_2$. The fault data unit 304A, e.g., may be a cell that indicates a connectivity fault and specifies all fabric endpoints 20 as a destination, e.g., using a broadcast address. Fault data unit 304A, e.g., may indicate whether the entire fabric plane 22A is unusable due to the detected fault. Fault data unit 304A, e.g., may indicate whether the fault is restricted to a specific link of fabric plane 22A such that portions of fabric plane 22A remain usable to transport cells to fabric endpoint 20A.

In some cases, not all destination fabric endpoints 20 may be reachable via fabric plane 22B from fabric endpoint 20A. In such cases, fault detection module 28A may send fault notification messages on multiple fabric planes 22. For example, fault detection module 28A may first determine that operational fabric plane 22B provides reachability to the most destination fabric endpoints 20 of any of the operational fabric planes 22. In response, fault detection module 28A sends to stage 1 switch $256R_2$ a fault data unit 304A having a broadcast destination address that causes fabric plane 22B to send indications of the fault to each of the fabric endpoints 20 reachable by fabric plane 22B. Fault detection module 28A also unicasts separate fault messages (not shown) via at least one other operational fabric planes 22 to each of the destination fabric endpoints 20 not reachable by fabric plane 22B. Fault detection module 28A may determine the fabric plane 22 having the most reachable fabric endpoints 20 as well as the other fabric planes 22 by which to unicast the separate fault messages using, e.g., the spray mask for fault detection module 28A. Each of the fabric endpoints 20 thus receives an indication of the fault obtained by fault detection module 28A.

Stage 1 switch 256R₂, in response to either or both fault data units 304A, 304X, notifies all other fabric endpoints 20 in the switching system of the connectivity fault. In particular, stage 1 switch 256R₂ broadcasts a fault message to all stage 3 switches 260A₂-260R₂ of fabric plane 22B, which relay the fault message to fabric endpoints 20 connected to their respective output ports. As a result, fault detection module 28A may inform multiple destination fabric endpoints 20 of the connectivity fault using a single fault data unit 304A to fabric plane 22B rather than having to unicast fault messages to every other fabric endpoint 20.

Rather than immediately broadcasting a fault message to the stage 3 switches 260A₂-260R₂ in response to receiving one of fault data units 304A, 304X, stage 1 switch 256R₂ may wait a predefined time in order to consolidate multiple fault data units 304A, 304X. Because connectivity faults are often localized, they tend to affect multiple fabric endpoints 20 coupled to the same stage 1 switches or stage 3 switches, as is the case with fabric endpoints 20A, 20X. Consolidation may in some examples be performed by fault detection module 28A, which may collect fault information for multiple different faults detected by fault detection module 28A and notify other fabric endpoints 20 of the fault using a single fault data unit 304A to stage 1 switch 256R₂. In some examples, the predefined time for consolidation is 1 ms.

To facilitate consolidation by stage 1 switches for the fabric plane 22 by which the most fabric endpoints 20 are reachable, all fabric endpoints 20 coupled to the same stage 1 switches 256 for respective fabric planes 22 (e.g., all fabric endpoints 20 on a particular LCC) should send instances of fault data units 304 to the same stage 1 switch 256 for the same fabric plane 22. Fault detection modules 28 may accomplish this by selecting, to receive instances of fault data units 304, the fabric plane 22 that provides the best reachability to destination fabric endpoints 20.

As noted above, fabric endpoints 20 and stage switches of fabric planes 22 may address fabric endpoints 20 individually using destination addresses. Fabric endpoints 20 and stage switches of fabric planes 22 may also address sets of fabric endpoints 20 collectively coupled to one of stage 3 switches using one of a set of reserved addresses in an address space used by fabric planes 22 stage switches for switching to stage 3 switches. Fabric endpoints 20 and stage switches of fabric planes 22 may alternatively address all fabric endpoints 20 collectively using a broadcast address from the set of reserved addresses. In one example, a set of destination addresses is reserved: 0xF00+F3_ID (up to a maximum value of 0xFFF), where F3_ID is an offset from 0xF00 that identifies one of stage 3 switches 260 in a fabric plane and, by extension, all fabric endpoints 20 coupled to the identified stage 3 switch 260. The value 0xFFF is reserved as a broadcast address that indicates all fabric endpoints 20 in the switching system and not merely those coupled to a particular stage 3 switch 260. Other destination addresses (e.g., 0x0-0xF00), may be usable for addressing individual fabric endpoints 20.

If any of stage 1 switches 256 or stage 2 switches 258 receives a cell that includes an indication of a fault and is addressed to one of the reserved destination addresses, the switch sprays the cell (or a different cell also including the indication) to the identified stage 3 260 switch. If the reserved destination address is a broadcast address, however, the switch may in some cases generate and send respective cells each having the indication of the fault to all stage 3 260 switches reachable from the switch. In some instances, the switch may simply spray the received cell to all stage 3 260 switches reachable from the switch with the broadcast address. If any of stage 3 260 switches receives a cell addressed to itself (e.g., it is the switch identified by the offset F3 ID in the example above) or the broadcast address (e.g., 0xFFF) from one of the reserved destination addresses, the switch generates and sends respective cells each having the indication of the fault to all fabric endpoints 20 coupled to the switch. In this way, the fabric planes 22 may distribute indications of faults detected by the fabric endpoints 20 or by switches of the fabric planes 22 with a reduced number of messages relative to individually addressing each of fabric endpoints 20 from fabric endpoint 20A.

In the example of FIG. 6C, stage 1 switch 256R₂ receives fault data unit 304A, which may be destined for a broadcast address so as to notify all fabric endpoints 20 of the connectivity fault detected by fault detection module 28A. In response, stage 1 switch 256R₂ generates fault notification data units 306 (fault notification cells 306) addressed to respective stage 3 switches 260 reachable from stage 1 switch 256R₂. For example, the fault notification cell 306 sent to stage 3 switch 260A₂ may be addressed to 0xF00 that identifies stage 3 switch 260A₂. The stage 3 switches 260 receive the fault notification cells 306 and each such switch generates and sends respective fault notification data units 308 (or "fault notification cells 308") each having the indication of the fault to all fabric endpoints 20 coupled to the switch.

Figure 7:
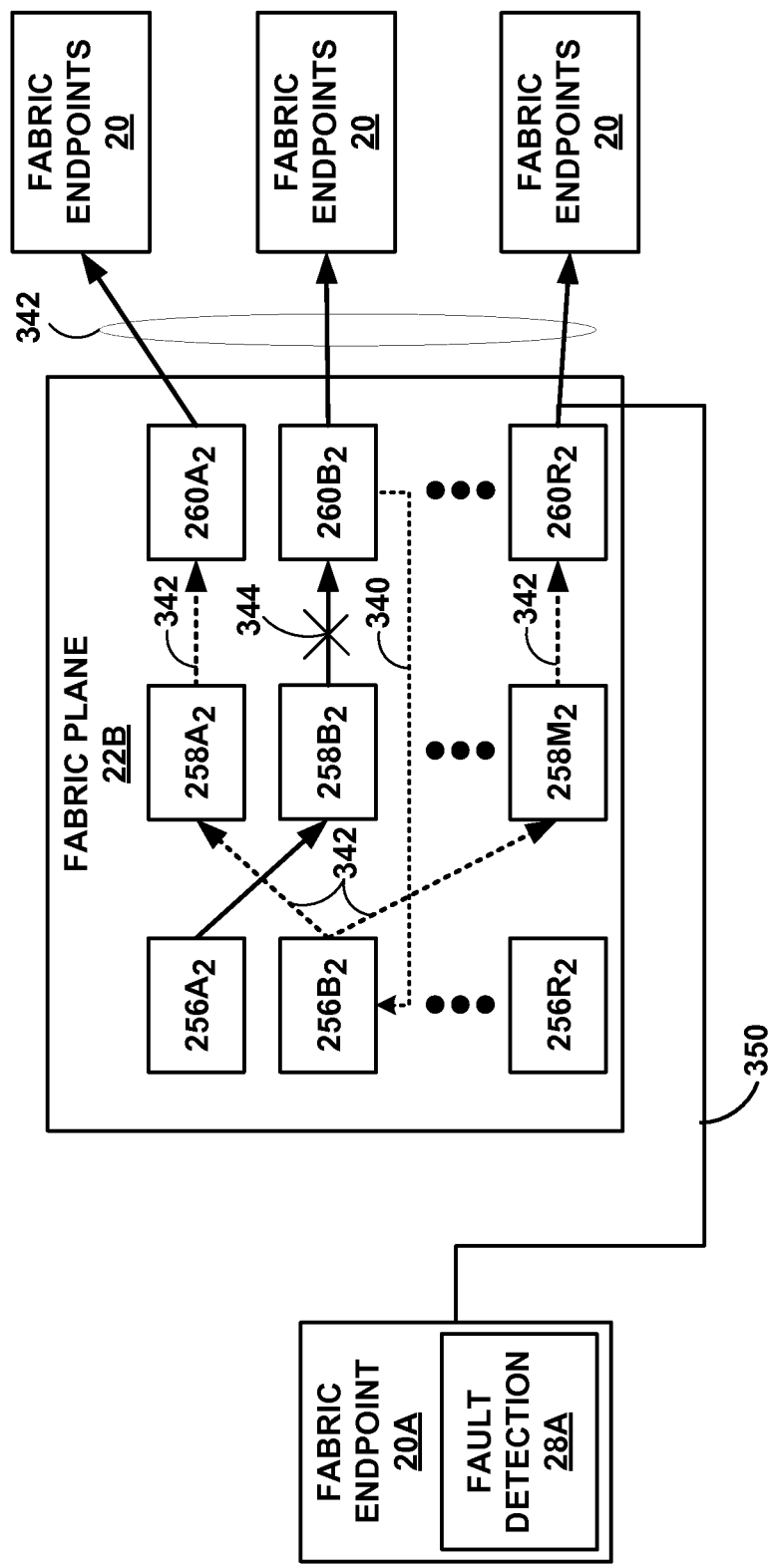
FIG. 7 is a block diagram illustrating fabric fault detection and distribution of an indication of fabric faults by a fabric plane, in accordance with techniques described in this disclosure.

FIG. 7 is a block diagram illustrating fabric fault detection and distribution of an indication of such fabric faults by a fabric plane, in accordance with techniques described in this disclosure. As described above, each receiver of data cells communicates receive link status to each sender of data cells for the link connecting the sender to the receiver. In the illustrated example, stage 3 switch 260B₂ receives an indication of a link error 344 on the F2→F3 link coupling stage 2 switch 268B₂ to stage 3 switch 260B₂. In some instances of fabric planes 22, stage 1 switches each have a corresponding stage 3 switch with a direct communication link (e.g., a flow control link such as link 186 of FIG. 3), and vice-versa. Stage 3 switch 260B₂ handles this indication by relaying the indication of the link error 344 to stage 1 switch 256B₂ using fault indication message 340. Fault indication message 340 may in some instances be a cell that includes an indication of the fault. Stage 1 switch 256B₂ responds to fault indication message 340 by disabling spray to the impacted F2→F3 link having the link error, and also by generating and sending respective fault notification data unit 342 (or "fault notification cells 342") addressed to stage 3 switches 260 reachable from stage 1 switch 256B₂, in a manner similar to that described above with respect to fault notification cells 306 of FIG. 6C. Fault notification cells 342 may include the indication of the fault and may identify the failed link. Although not shown for ease of illustration purposes, stage 1 switch 256B₂ may also send a fault notification cell 306 to stage 3 switch 260B₂. Stage 3 switches 260 that receive a fault notification cell 342 generate and send respective fault notification cells 342 each having the indication of the fault to all fabric endpoints 20 coupled to the switch.

In addition to this illustrated example, stage 1 switches 256 may be configured to handle other link errors besides link errors for F2→F3 link. For instance, on receiving an indication of a FE→F1 or F1→F2 link error, where F1 is the stage 1 switch 256B₂, e.g., the stage 1 switch 256B₂ may send respective fault notification cells to stage 3 switches 260 reachable from stage 1 switch 256B₂, in a manner similar to that described above with respect to fault notification cells 342. The fault notification cells include the indication of the fault and may identify the failed link.

Stage 1 switches 256, where possible, may consolidate fault notification cells to each of stage 3 switches 260 on a per-plane basis, for all fabric endpoints 20 coupled to the stage 1 switch and reporting a fault on the fabric plane 22. Thus stage 1 switches 256 may send only a small number of fault notification cells across the switch fabric to convey fabric plane 22/link faults.

In the case of FE→F1 link errors, the responsibility for notifying fabric endpoints 20 of the fault is assumed by the F1 switch, e.g., one of stage 1 switches 256. As a result, in some embodiments, an ungraceful jackout of a line card can be detected in sub-ms time. An ungraceful jackout of a switch card for one or more fabric planes, on the other hand, will be detected as a F3→FE error and is handled by the FE. For example, fault detection module 28A may receive an indication of a link fault in F3→FE link 350. In response, fault detection module 28A declares fabric plane 22B as faulty and performs actions similar to those described above with respect to FIGS. 6A-6C for responding to a connectivity fault determined by fault detection module 28A using self-ping techniques. That is, fabric endpoint 20A ceases spraying on fabric plane 22B for all destination fabric endpoints 20. In addition, fault detection module 28A may send, to an active fabric plane 22, a message similar to fault data unit 304A, which indicates the link fault to a stage 1 switch 256 of the active fabric plane. The stage 1 switch generates and sends fault notification cells addressed to respective stage 3 switches 260 reachable from the stage 1 switch that receives the message so as to broadcast the indication.

Upon receiving a fault notification cells, e.g., fault notification cells 308, 342, fabric endpoints 20 cease spraying using the faulty fabric plane 22 to reach the fabric endpoint 20 that reported the fault so as to prevent any additional traffic blackholing. Fault notification cells and other messages described herein to provide indications of fault may include information identifying the faulty fabric plane 22.

Intermediate stage switches, such as switches 258 may be configured to handle destination addresses identifying final stage (stage 3 or F3) switches and the broadcast address in order to spray the cells to the identified final stage switch. In case of an F2→F3 fabric link error, a switch 258 disables spray to the affected link. In case of an F1→F2 fabric link error, a switch 258 relays the error upstream to the sending F1.

As a result of applying the techniques described herein, a switching system may identify faults and distribute fault notifications with a relatively small number of messages/cells. In some implementations, a worst-case scenario is the loss of intermediate-stage chassis taking down a fabric plane for all fabric endpoints 20 in the system. If each fabric endpoint 20 were to unicast a fault notification to each other fabric endpoint 20, this would require $O(N)^2$ messages, where N=number of fabric endpoints 20). Using the above techniques, the number of messages needed may be reduced because each fabric endpoint 20 may send only a single message to a stage 1 switch on a yet-active fabric plane. The stage 1 switches on the active fabric plane may collate such messages they receive from their connected fabric endpoints 20 and send a single message to each stage 3 switch on the active fabric plane. In some examples, this may result in the number of such messages being sent scaling linearly with the number of stage 1/stage 3 switches in the system.

For instance, an implementation may have 16 stage 1 switches and 16 stage 3 switches for a fabric plane. If every fabric endpoint 20 coupled to a stage 1 switch sends a fault notification message to its stage 1 switch, this may still result in only 16 fault notification cells sprayed by each the stage 1 switches (1 fault notification cell from each stage 1 switch to each stage 3 switch), for a total of 16*16 fault notification cells. This may be a reduced figure from convention techniques, such as the 512*512 messages needed if each fabric endpoint 20 were to send a message to each other fabric endpoint 20 and there are 512 fabric endpoints 20.

Figure 8:
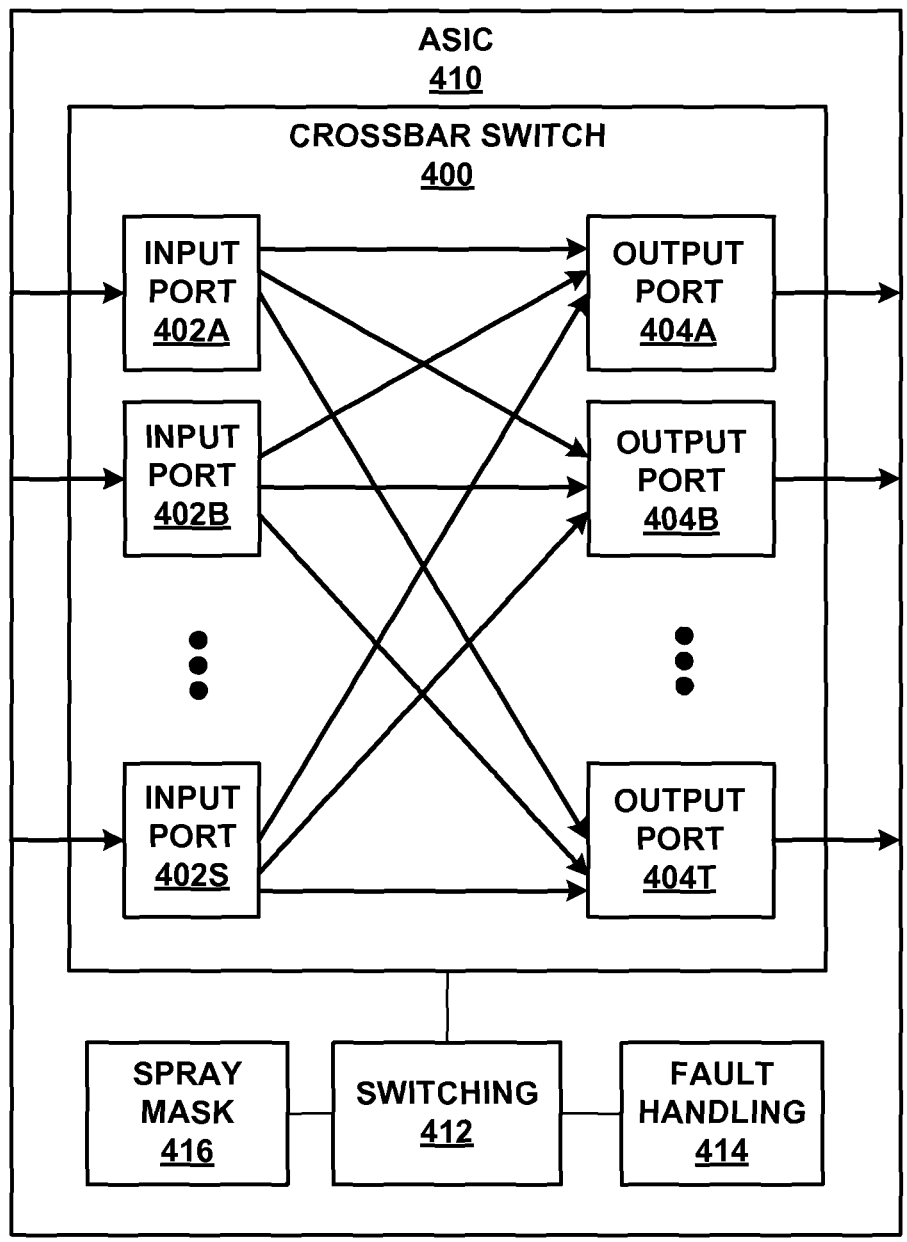
FIG. 8 is a block diagram depicting an application-specific integrated circuit (ASIC) configured to implement a stage switch and perform fault detection and distribution of fault indications in accordance with techniques described in this disclosure.

FIG. 8 is a block diagram depicting an application-specific integrated circuit (ASIC) configured to implement a stage switch and perform fault detection and distribution of fault indications in accordance with techniques described in this disclosure. ASIC 410 represents hardware-based logic and may include a programmable integrated circuit. ASIC 410 may represent an example of a fabric chip and implements crossbar switch 400 for a stage of a multi-stage switching fabric. Crossbar switch 400 may represent any of switches 256, 258, 260, 162, 164, and 166, for instance.

Crossbar switch 400 has input ports 402A-402S (collectively, "input ports 402") each capable of spraying cells via a full mesh to each of output ports 404A-404T (collectively, "output ports 404"). Switching module 412 is programmed with spray mask 416 that identifies output ports 404 usable for reaching destination fabric endpoints 20. Fault handling module 414 may be configured to perform techniques described herein to, e.g., detect link faults and to handle fault notification cells and generate and send fault notification cells/messages. Although individual F1, F2 and F3 stage crossbars are described herein, respectively, as components in the first, second, and third stages of multi-stage switching fabrics, a single generic type of F stage crossbar switch may be used for all three stages by configuring the operational mode of the ASIC 410 accordingly.

Figure 9:
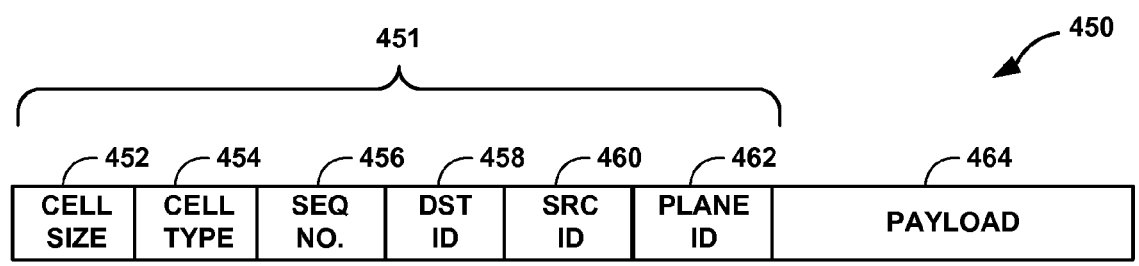
FIG. 9 is a block diagram illustrating an example data cell format according to techniques of this disclosure.

FIG. 9 is a block diagram illustrating an example data cell format according to techniques of this disclosure. Different cell types according to data cell 450 define operations for fabric endpoints 20 and different stage switches in a multi-stage switch fabric, as described in further detail below. Data cell 450 includes a cell header 451 and cell payload 464. Cell header 451 includes the following fields: cell size 452, cell type 454, sequence number (SEQ NO.) 456, destination identifier (DST ID) 458, and source identifier 460 (SRC ID). Various example implementations for cell header 451 may rearrange fields, include more or fewer fields, and so forth.

Cell size 452 specifies the size of the cell payload 464 or, in some cases, the size of data cell 450 including both the cell header 451 and the cell payload 464. Example cell sizes include 16, 24, and 32 bytes. Cell type 454 identifies the type of the cell, including the type of fabric chip (e.g., a first stage, intermediate/second stage, third/final stage, or fabric endpoint) that is to consume and process the cell. Sequence number 456 identifies a sequence number for the cell. Cell destination identifier 458 and cell source identifier 458 identify the destination fabric endpoint and source fabric endpoint for the cell, respectively. Plane identifier 462 identifies the fabric plane for switching the cell. The data payload 464 for data cell 450 is typically packet data for packets switched by the switching system, whether a packet switch or data center fabric for instance. However, as described in further detail below, payload 464 may identify the cell as a self-ping message or include indications of connectivity faults or fabric faults in a fabric plane of the switching system.

In one example instance, data cell 450 is a self-ping cell. The data cell 450 instance may be an example instance of a self-ping cell 302, for example. The fields of cell header 451 may be set as follows:

| Cell size 452 | CELL_SIZE |
|---|---|
| Cell type 454 | FOR_ENDPOINT |
| Seq. No. 456 | [sequence number] |
| DST ID 458 | SELF_ID |
| SRC ID 460 | SELF_ID |
| Plane ID 462 | [fabric plane] |

The FOR_ENDPOINT cell type indicates the cell is to be consumed by fabric endpoints. All fabric endpoints ports may include a filter configured to capture data cells having the FOR_ENDPOINT cell type. Because both the source identifier 460 and destination identifier 458 specify the originating fabric endpoint identified by SELF_ID as source and destination of the cell, the fabric plane specified in plane identifier 462 switches the cell back toward the originating fabric endpoint. The data payload 464 may include data indicating the cell is a ping request.

In another example instance, data cell 450 is a self-ping timeout fault signaling cell to be multicast to destination fabric endpoints that are impacted by the fault. For F3→FE link errors, the FE signals the fault to all connected fabric endpoints. The data cell 450 instance may be an example instance of a fault data unit 304, for example. The fields of cell header 451 may be set as follows for this instance:

| Cell size 452 | CELL_SIZE |
|---|---|
| Cell type 454 | EP_TO_F1 |
| Seq. No. 456 | 0 |
| DST ID 458 | BROADCAST_ADDRESS |
| SRC ID 460 | SOURCE_ID |
| Plane ID 462 | [fabric plane] |

The EP_TO_F1 cell type indicates the cell has been sent by a fabric endpoint (SOURCE_ID) and is to be consumed by stage 1 (F1) switches. All stage 1 switches ports may include a filter configured to capture data cells having the EP_TO_F1 cell type (or any other TO_F1_cell type). The BROADCAST_ADDRESS indicates that the stage 1 switch that receives the cell is to send a fabric endpoint fault signaling relay cell (described below) to stage 3 switches reachable from the stage 1 switch. The data payload 464 may include data indicating the fault is a self-ping timeout error. This faulty fabric plane will be different than the fabric plane identified in plane identifier 462.

In another example instance, data cell 450 is a fabric link fault signaling cell to be multicast to destination fabric endpoints that are impacted by the fault. For F3→FE link errors, the FE signals the fault to all connected fabric endpoints. The data cell 450 instance may be an example instance of a fault data unit 304, for example. The fields of cell header 451 may be set as follows for this instance:

| Cell size 452 | CELL_SIZE |
|---|---|
| Cell type 454 | EP_TO_F1 |
| Seq. No. 456 | 0 |
| DST ID 458 | BROADCAST_ADDRESS |
| SRC ID 460 | SOURCE_ID |
| Plane ID 462 | [fabric plane] |

The EP_TO_F1 cell type indicates the cell has been sent by a fabric endpoint (SOURCE_ID) and is to be consumed by stage 1 (F1) switches. The BROADCAST_ADDRESS indicates that the stage 1 switch that receives the cell is to send a fabric endpoint fault signaling relay cell (described below) to stage 3 switches reachable from the stage 1 switch. The data payload 464 may include data indicating the fault is a fabric link error and may identify the faulty fabric plane. This faulty fabric plane will be different than the fabric plane identified in plane identifier 462.

In another example instance, data cell 450 is a fabric endpoint fault signaling relay cell usable for relaying/multicasting fault signaling cells received by stage 1 switches to final stage (F3) switches. All final stage switches ports may include a filter configured to capture data cells having the F1_TO_F3 cell type (or any other TO_F3 cell type). A fabric endpoint fault signaling relay cell may be an example instance of fault notification cells 306. Fabric endpoint fault signaling relay cell are based on faults broadcast from a fabric endpoint, and a receiving stage 1 switch sprays respective fabric endpoint fault signaling relay cells to each fabric final stage on the fabric plane. The fields of cell header 451 may be set as follows for this instance:

| Cell size 452 | CELL_SIZE |
|---|---|
| Cell type 454 | F1_TO_F3 |
| Seq. No. 456 | 0 |
| DST ID 458 | F3_ADDRESS |
| SRC ID 460 | SOURCE_ID |
| Plane ID 462 | [fabric plane] |

The F1_TO_F3 cell type indicates the cell has been sent by a stage 1 switch and is to be consumed by a final stage switch. This final stage switch is identified by F3_ADDRESS in destination identifier 458. The SOURCE_ID in source identifier 460 is copied from the original self-ping timeout fault signaling cell sent by a fabric endpoint. The data payload 464 may include data indicating the fault is a self-ping timeout error and may identify the faulty fabric plane. This faulty fabric plane will be different than the fabric plane identified in plane identifier 462.

In another example instance, data cell 450 is a fabric link fault signaling cell usable for multicasting indications of fabric link faults. Fabric link fault signaling cell are generated by stage 1 switches in response to receiving indications of link faults, including those from fabric endpoints. A fabric link fault signaling cell may be an example instance of fault notification cells 342. For FE→F1 type or F1→F2 type link errors, the stage 1 switches may signal the fault to all impacted stage 3 switches. The fields of cell header 451 may be set as follows for this instance:

| Cell size 452 | CELL_SIZE |
|---|---|
| Cell type 454 | F1_TO_F3 |
| Seq. No. 456 | 0 |
| DST ID 458 | F3_ADDRESS |
| SRC ID 460 | F1_ADDRESS |
| Plane ID 462 | [fabric plane] |

The F1_TO_F3 cell type indicates the cell has been sent by the stage 1 switch identified by F1_ADDRESS in source identifier 460 and is to be consumed by a final stage switch. This final stage switch is identified by F3_ADDRESS in destination identifier 458. The data payload 464 may include data indicating the fault is a fabric link error, identifying the type of the fabric link having the fault, and may identify the faulty fabric plane. This faulty fabric plane will be different than the fabric plane identified in plane identifier 462. The data in data payload 464 may further identify the stage 2 switch address for F1→F2 link errors.

In another example instance, data cell 450 is a fabric endpoint fault signaling relay cell from a final stage switch to a fabric endpoint. This instance may be an example of a fault notification cell 308. These fabric endpoint fault signaling relay cell are generated by final stage switches in response to receiving indications of self-ping timeout errors. A final stage switch that receives this indication generates and sprays a fabric endpoint fault signaling relay cell to each fabric endpoint connected to it. The fields of cell header 451 may be set as follows for this instance:

| Cell size 452 | CELL_SIZE |
|---|---|
| Cell type 454 | FOR_ENDPOINT |
| Seq. No. 456 | 0 |
| DST ID 458 | DESTINATION_ID |
| SRC ID 460 | SOURCE_ID |
| Plane ID 462 | [fabric plane] |

The data payload 464 may include data indicating the fault is self-ping timeout error, and may identify the faulty fabric plane. This faulty fabric plane will be different than the fabric plane identified in plane identifier 462.

In another example instance, data cell 450 is a fabric endpoint fault signaling cell from a final stage switch to a fabric endpoint. This instance may be an example of a fault notification cell 342. These fabric endpoint fault signaling relay cell are generated by final stage switches in response to receiving indications of F2→F3 link errors. A final stage switch that receives this indication generates and sprays a fabric endpoint fault signaling relay cell to each fabric endpoint connected to it. The fields of cell header 451 may be set as follows for this instance:

| Cell size 452 | CELL_SIZE |
|---|---|
| Cell type 454 | FOR_ENDPOINT |
| Seq. No. 456 | 0 |
| DST ID 458 | DESTINATION_ID |
| SRC ID 460 | SOURCE_ID |
| Plane ID 462 | [fabric plane] |

The data payload 464 may include data indicating the fault is a fabric link error, identifying the type of the fabric link having the fault, and may identify the faulty fabric plane. This faulty fabric plane will be different than the fabric plane identified in plane identifier 462. The data in data payload 464 may further identify the stage 2 switch address for the F2→F3 link.

Figure 10:
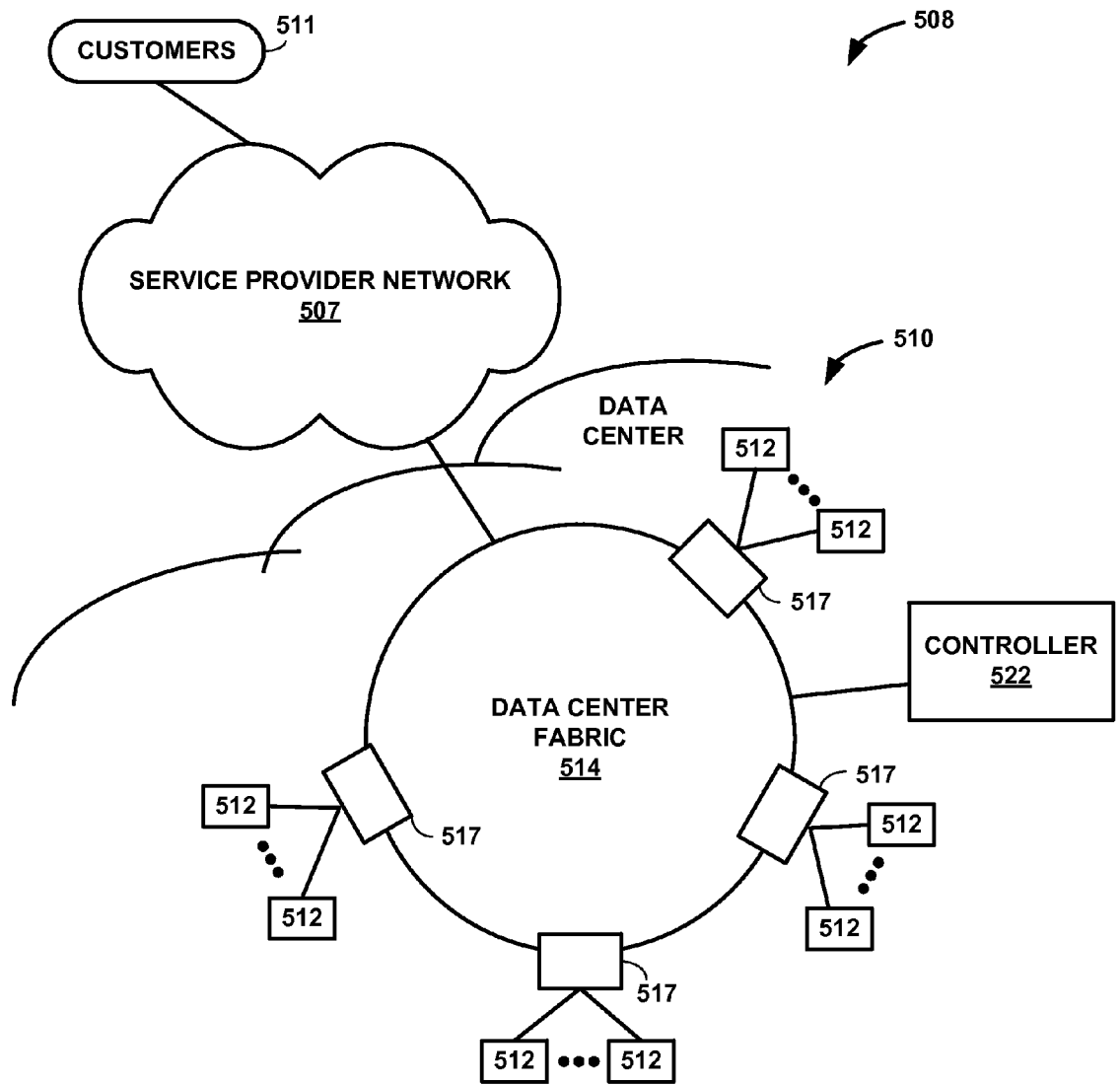
FIG. 10 is a block diagram illustrating an example network 508 having a data center 510 in which examples of the techniques described herein may be implemented.

FIG. 10 is a block diagram illustrating an example network 508 having a data center 510 in which examples of the techniques described herein may be implemented. In general, data center 510 provides an operating environment for applications and services for customers 511 coupled to the data center by service provider network 507. Data center 510 may, for example, host infrastructure equipment, such as networking and storage systems, redundant power supplies, and environmental controls. Service provider network 507 may be coupled to one or more networks administered by other providers, and may thus form part of a large-scale public network infrastructure, e.g., the Internet.

In some examples, data center 510 may represent one of many geographically distributed network data centers. As illustrated in the example of FIG. 10, data center 510 may be a facility that provides network services for customers 511. Customers 511 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 510 may be individual network servers, network peers, or otherwise.

In this example, data center 510 includes a set of storage systems and application servers 512A-512X (herein, "servers 512") interconnected via high-speed switch fabric 514 provided by one or more tiers of physical network switches and routers. Servers 512 provide execution and storage environments for applications and data associated with customers 511 and may be physical servers, virtual machines or combinations thereof. In some examples, the servers 512 can each be or represent, for example, a virtual network, a local area network (LAN), a wide area network (WAN), and/or a storage area network (SAN), and can each include one or more wired and/or wireless segments.

In general, switch fabric 514 represents layer two (L2) and layer three (L3) switching and routing components that provide point-to-point connectivity between servers 512, the switch fabric being controlled by controller 522. In one example, switch fabric 514 comprises a set of interconnected, high-performance yet off-the-shelf packet-based routers and switches that implement industry standard protocols. In one example, switch fabric 514 may comprise off-the-shelf components that provide Internet Protocol (IP) over an Ethernet (IPoE) point-to-point connectivity. Switch fabric 514 may be cell-based fixed-length or variable-length) or packet-based.

As shown in FIG. 10, the edge devices 517 are at the edges of the data center 510 and represent gateways to the servers 512. The switch fabric 514 of the data center 510 is a multi-stage switch fabric for switching data units between the edge devices 517. In some examples, the switch fabric 514 can be defined by one or more multi-stage switches (not shown) that each include one or more switch fabrics. In some examples, the switch fabric 514 can be configured to function as a single logical entity. Switch fabric 514 may include, for instance a first layer of access switches that operate as first (F1) and final (F3) stages of a multi-stage switch fabric and a second layer of aggregation switches that operate as intermediate (F2) stages of the multi-stage switch fabric. Switch fabric 514 may be implemented as multiple parallel fabric planes, with each of the parallel fabric planes providing an independent multi-stage switch fabric to provide switching redundancy.

Servers 512 direct flows of data units to one another via the switch fabric 514. In this respect, each of edge devices 514 may represent an example of and perform the functionality described with respect to a fabric endpoint 20 described above, and switch fabric 514 may represent an example of multi-stage switch fabric 18 of FIG. 2 or multi-stage switch network 250. Accordingly, each of the individual switches making up the switch fabric 514 may represent an example of and perform the corresponding F1, F2, or F3 functionality described above for fault detection and fault indication distribution.

Figure 11:
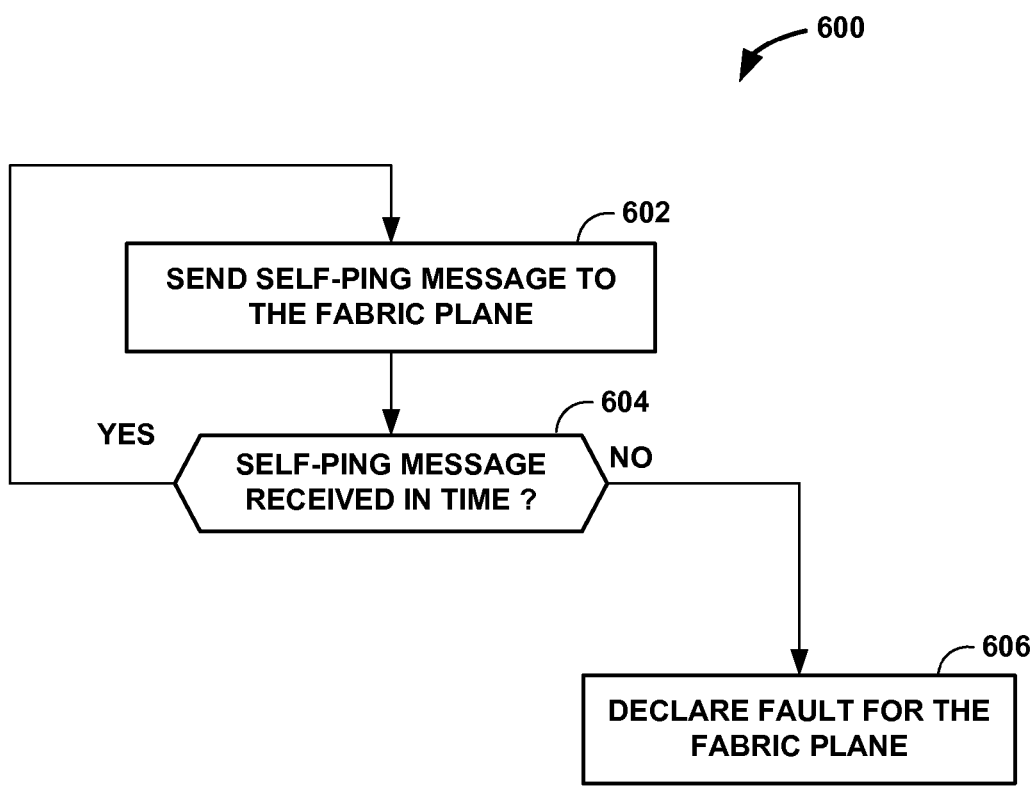
FIG. 11 is a flowchart illustrating an example mode of operation for a fabric endpoint to detect faults with a fabric plane according to techniques described in this disclosure.

FIG. 11 is a flowchart illustrating an example mode of operation for a fabric endpoint to detect faults with a fabric plane according to techniques described in this disclosure. Mode of operation 600 is described for illustration purposes with respect to fabric endpoint 20A and fabric plane 22A of FIG. 5. Fabric endpoint 20A periodically sends a self-ping data unit 302 to fabric plane 22A (602). If the fabric endpoint 20A receives the self-ping data unit 302 back from the fabric plane 22A before a predefined time expires (YES branch of 604), the fabric endpoint continues to send self-ping data units 302 to fabric plane 22A (602). If the predefined time expires, however, before fabric endpoint 20A receives the self-ping data unit 302 back from the fabric plane 22A (NO branch of 604), then fabric endpoint 20A declare a fault for fabric plane 22A (606). As one example operation in response to declaring a fault, fabric endpoint 22A may cease spraying data units on the fabric plane 22A, at least temporarily. In some examples, fabric endpoint 20A only declares a fault after multiple consecutive failures to receiving timely self-ping data units 302.

Figure 12:
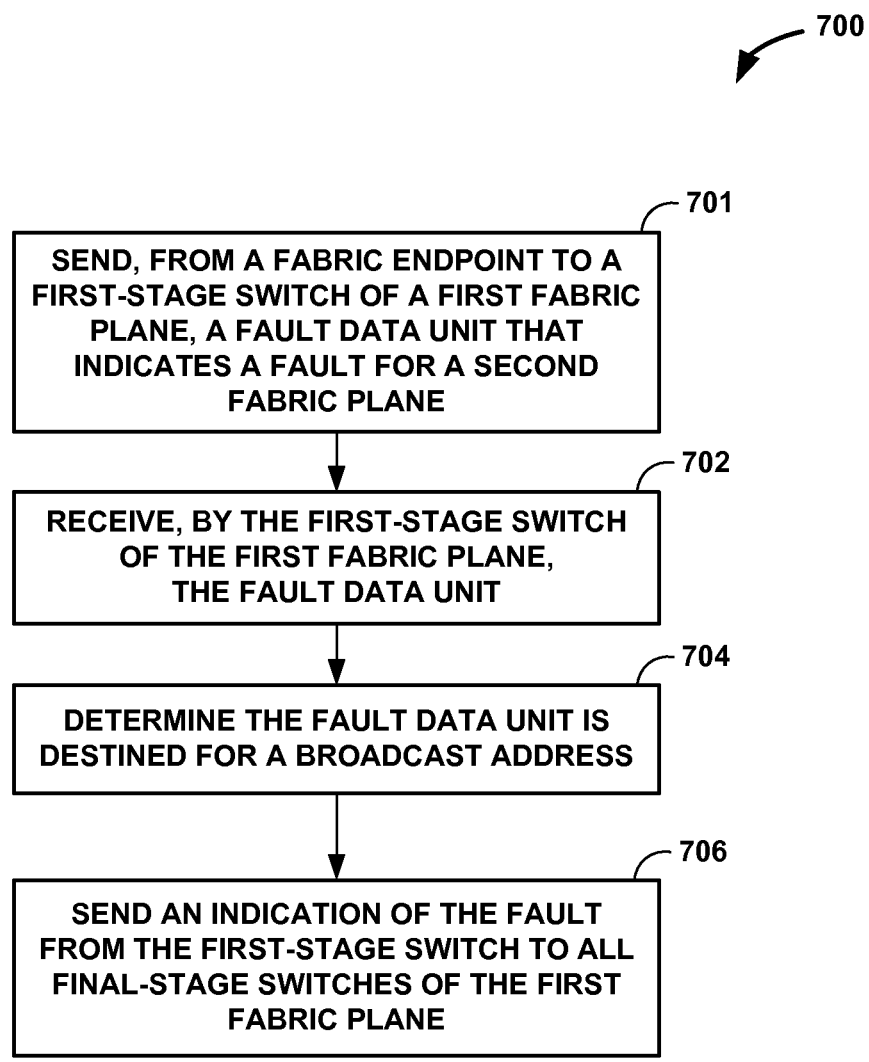
FIG. 12 is a flowchart illustrating an example mode of operation for a first stage switch to notify fabric endpoints of a fault for a fabric plane according to techniques described in this disclosure.

FIG. 12 is a flowchart illustrating an example mode of operation for a first stage switch to notify fabric endpoints of a fault for a fabric plane according to techniques described in this disclosure. Mode of operation 700 is described for illustration purposes with respect to fabric planes 22A and 22B of FIG. 5 but is applicable to any two fabric planes according to the descriptions herein. A fabric endpoint 20 coupled to fabric planes 22 send a fault data unit to Stage 1 (or "first stage") switch $256R_2$ of fabric plane 22B (701), which receives the fault data unit 304A (702). Fault data unit 304A includes an indication of a fault for fabric plane 22A. The stage 1 switch $256R_2$ determines that the fault data unit 304A specifies a broadcast address (704) and, in response, the stage 1 switch $256R_2$ generates and sends indications of the fault as fault notification data units 306 (fault notification cells 306) addressed to respective stage 3 (or "final stage") switches $260A_2$-$260R_2$ reachable from stage 1 switch $256R_2$ (706). In this way, the first stage switch may multicast the indication using a small number of data units (equal to the number of reachable stage 3 switches 260).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method of verifying fabric connectivity with a multi-stage switch fabric having a plurality of fabric planes each having a plurality of stages to switch data units between any of a plurality of fabric endpoints, the method comprising:

sending, by a fabric endpoint of the plurality of fabric endpoints to a first-stage switch of a first fabric plane of the plurality of fabric planes, a self-ping message destined for the fabric endpoint sending the self-ping message; and sending, by the fabric endpoint to a first-stage switch of a second fabric plane of the plurality of fabric planes and in response to determining the fabric endpoint has not received the self-ping message after a predetermined time, a fault data unit that includes an indication of a connectivity fault for the first fabric plane, the first fabric plane different than the second fabric plane.

2. The method of claim 1, further comprising:

switching, by an intermediate-stage switch of the multi-stage switch fabric, the self-ping message to a final-stage switch of the first fabric plane, the final-stage switch coupled by an output port to the fabric endpoint;

switching, by the final-stage switch to the fabric endpoint, the self-ping message; and determining, by the fabric endpoint in response to receiving the self-ping message within the predetermined time, the first fabric plane does not have a connectivity fault.

3. The method of claim 1, wherein the plurality of fabric endpoints comprises a plurality of forwarding components interconnected within a network router by the multi-stage switch fabric.

4. The method of claim 1, wherein the plurality of fabric endpoints comprises a plurality of edge devices interconnected within a data center by the multi-stage switch fabric.

5. The method of claim 1, wherein the fabric endpoint comprises a first fabric endpoint, and wherein the fault data unit comprises a first fault data unit, the method further comprising:

receiving, by the first-stage switch of the second fabric plane of the multi-stage switch fabric and from the first fabric endpoint, the first fault data unit that includes the indication of the connectivity fault;

receiving, by the first-stage switch of the second fabric plane and from a second fabric endpoint of the plurality of fabric endpoints, a second fault data unit that includes the indication of the connectivity fault; and sending, by the first-stage switch of the second fabric plane to a final-stage switch of the second fabric plane and after consolidating the first fault data unit and the second fault data unit, a fault notification data unit that includes the indication of the connectivity fault.

6. The method of claim 1, wherein the indication of the connectivity fault identifies the first fabric plane.

7. The method of claim 1, wherein the fault data unit is destined for a broadcast address that specifies each of the plurality of fabric endpoints as an intended recipient of the fault data unit.

8. A method of signaling a fabric fault for a multi-stage switch fabric having a plurality of fabric planes each having a plurality of stages to switch data units between any of a plurality of fabric endpoints, the method comprising:
receiving, by a first-stage switch of a first fabric plane of the plurality of fabric planes, an indication of a fabric fault for a second fabric plane of the plurality of fabric planes, the first fabric plane different than the second fabric plane;
sending, by the first-stage switch to a first final-stage switch of the first fabric plane, a first fault notification data unit that includes the indication of the fabric fault; and
sending, by the first-stage switch to a second final-stage switch of the first fabric plane, a second fault notification data unit that includes the indication of the fabric fault.

9. The method of claim 8,
wherein the indication comprises a fault data unit sent by a fabric endpoint of the plurality of fabric endpoints and the fabric fault is a connectivity fault for the second fabric plane,
wherein sending the first fault notification data unit comprises sending, by the first-stage switch in response to determining the fault data unit includes a broadcast address that specifies each of the plurality of fabric endpoints as an intended recipient of the fault data unit, the first fault notification data unit, and
wherein sending the second fault notification data unit comprises sending, by the first-stage switch in response to determining the fault data unit includes the broadcast address, the second fault notification data unit.

10. The method of claim 8, further comprising:
sending, by the first final-stage switch to at least one fabric endpoint of the plurality of fabric endpoints that is coupled to the first final-stage switch and in response to receiving the first fault notification data unit, a third fault notification data unit that includes the indication of the fabric fault.

11. The method of claim 10, further comprising:
modifying, by the at least one fabric endpoint in response to receiving the third fault notification data unit, a configuration of the at least one fabric endpoint to cause the at least one fabric endpoint to at least temporarily cease sending data units via the second fabric plane having the fabric fault.

12. The method of claim 8,
wherein the first fault notification data unit includes a first destination identifier that identifies the first final-stage switch, and
wherein the second fault notification data unit includes a second destination identifier that identifies the second final-stage switch.

13. The method of claim 8, further comprising:
receiving, by an intermediate-stage switch of the first fabric plane, the first fault notification data unit; and
sending, by the intermediate-stage switch in response to determining the first fault notification data unit includes a first destination identifier that identifies the first final-stage switch, the first fault notification data unit to the first final-stage switch.

14. The method of claim 8, wherein the fabric fault comprises a fabric link fault for fabric link connecting one of a first-stage switch with a second stage switch, a second stage switch with a third stage switch, and a third stage switch with a fabric endpoint of the plurality of fabric endpoints.

15. A switching system comprising:
a plurality of fabric endpoints;
a multi-stage switching fabric having a plurality of fabric planes each having a plurality of stages to switch data units between any of the plurality of fabric endpoints,
wherein a fabric endpoint of the fabric endpoints is configured to send, to a first-stage switch of a first fabric plane of the plurality of fabric planes, a self-ping message destined for the fabric endpoint,
wherein the fabric endpoint is configured to send, to a first-stage switch of a second fabric plane of the plurality of fabric planes, in response to determining the fabric endpoint has not received the self-ping message after a predetermined time, a fault data unit that includes an indication of a connectivity fault for the first fabric plane, the first fabric plane different than the second fabric plane.

16. The switching system of claim 15, further comprising:
switching, by an intermediate-stage switch of the multi-stage switch fabric, the self-ping message to a final-stage switch of the first fabric plane, the final-stage switch coupled by an output port to the fabric endpoint;
switching, by the final-stage switch to the fabric endpoint, the self-ping message; and
determining, by the fabric endpoint in response to receiving the self-ping message within the predetermined time, the first fabric plane does not have a connectivity fault.

17. The switching system of claim 15, wherein the plurality of fabric endpoints comprises one of a plurality of forwarding components interconnected within a network router by the multi-stage switch fabric.

18. The switching system of claim 15,
wherein the plurality of fabric endpoints comprises a plurality of edge devices interconnected within a data center by the multi-stage switch fabric.

19. The switching system of claim 15,
wherein the fabric endpoint comprises a first fabric endpoint,
wherein the fault data unit comprises a first fault data unit,
wherein a first-stage switch of a second fabric plane of the plurality of fabric planes is configured to receive a first fault data unit that includes the indication of the connectivity fault,
wherein the first-stage switch of the second fabric plane is configured to receive, from a second fabric endpoint of the plurality of fabric endpoints, a second fault data unit that includes the indication of the connectivity fault, and
wherein the first-stage switch of the second fabric plane is configured to send, to a final-stage switch of the second fabric plane and after consolidating the first fault data unit and the second fault data unit, a fault notification data unit that includes the indication of the connectivity fault.

20. The switching system of claim 15, wherein the indication of the connectivity fault identifies the first fabric plane.

21. The switching system of claim 15, wherein the fault data unit is destined for a broadcast address that specifies each of the plurality of fabric endpoints as an intended recipient of the fault data unit.

22. A switching system comprising:
a plurality of fabric endpoints;
a multi-stage switching fabric having a plurality of fabric planes each having a plurality of stages to switch data units between any of a plurality of fabric endpoints,
wherein a first-stage switch of a first fabric plane of the plurality of fabric planes is configured to receive an indication of a fabric fault for a second fabric plane of the plurality of fabric planes, the first fabric plane different than the second fabric plane;
wherein the first-stage switch is configured to send, to a first final-stage switch of the first fabric plane, a first fault notification data unit that includes the indication of the fabric fault, and
wherein the first-stage switch is configured to send, to a second final-stage switch of the first fabric plane, a second fault notification data unit that includes the indication of the fabric fault.

23. The switching system of claim 22,
wherein the indication comprises a fault data unit sent by a fabric endpoint of the plurality of fabric endpoints and the fabric fault is a connectivity fault for the second fabric plane,
wherein to sending the first fault notification data unit the first-stage switch is configured to send, in response to determining the fault data unit includes a broadcast address that specifies each of the plurality of fabric endpoints as an intended recipient of the fault data unit, the first fault notification data unit, and
wherein sending the second fault notification data unit comprises sending, by the first-stage switch in response to determining the fault data unit includes the broadcast address, the second fault notification data unit.

24. The switching system of claim 22,
wherein the first final-stage switch is configured to send, to at least one fabric endpoint of the plurality of fabric endpoints that is coupled to the first final-stage switch and in response to receiving the first fault notification data unit, a third fault notification data unit that includes the indication of the fabric fault.

25. The switching system of claim 24,
wherein the at least one fabric endpoint is configured to modify, in response to receiving the third fault notification data unit, a configuration of the at least one fabric endpoint to cause the at least one fabric endpoint to at least temporarily cease sending data units via the second fabric plane having the fabric fault.

26. The switching system of claim 22,
wherein the first fault notification data unit includes a first destination identifier that identifies the first final-stage switch, and
wherein the second fault notification data unit includes a second destination identifier that identifies the second final-stage switch.

27. The switching system of claim 22,
wherein an intermediate-stage switch of the first fabric plane is configured to receive the first fault notification data unit,
wherein the intermediate-stage switch is configured to send, in response to determining the first fault notification data unit includes a first destination identifier that identifies the first final-stage switch, the first fault notification data unit to the first final-stage switch.

28. The switching system of claim 22, wherein the fabric fault comprises a fabric link fault for fabric link connecting one of a first-stage switch with a second stage switch, a second stage switch with a third stage switch, and a third stage switch with a fabric endpoint of the plurality of fabric endpoints.

29. A computer-readable storage medium, the computer-readable storage medium comprising instructions for causing at least one programmable processor of a multi-stage switch fabric, having a plurality of fabric planes each having a plurality of stages to switch data units between any of a plurality of fabric endpoints, to:
send, by a fabric endpoint of the plurality of fabric endpoints to a first-stage switch of a first fabric plane of the plurality of fabric planes, a self-ping message destined for the fabric endpoint sending the self-ping message; and
send, by the fabric endpoint to a first-stage switch of a second fabric plane of the plurality of fabric planes and in response to determining the fabric endpoint has not received the self-ping message after a predetermined time, a fault data unit that includes an indication of a connectivity fault for the first fabric plane, the first fabric plane different than the second fabric plane.

30. A computer-readable storage medium, the computer-readable storage medium comprising instructions for causing at least one programmable processor of a multi-stage switch fabric, having a plurality of fabric planes each having a plurality of stages to switch data units between any of a plurality of fabric endpoints, to:
receive, by a first-stage switch of a first fabric plane of the plurality of fabric planes, an indication of a fabric fault for a second fabric plane of the plurality of fabric planes, the first fabric plane different than the second fabric plane;
send, by the first-stage switch to a first final-stage switch of the first fabric plane, a first fault notification data unit that includes the indication of the fabric fault; and
send, by the first-stage switch to a second final-stage switch of the first fabric plane, a second fault notification data unit that includes the indication of the fabric fault.

* * * * *